US009436668B2

(12) United States Patent
Dunn et al.

(10) Patent No.: US 9,436,668 B2
(45) Date of Patent: Sep. 6, 2016

(54) FORM COMPLETION RATE ENHANCEMENT SYSTEM AND METHOD

(75) Inventors: Cary Dunn, Santa Barbara, CA (US); Jonathan Siegel, Santa Barbara, CA (US); Daryl Bernstein, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 195 days.

(21) Appl. No.: 12/908,847

(22) Filed: Oct. 20, 2010

(65) Prior Publication Data
US 2011/0093807 A1    Apr. 21, 2011

Related U.S. Application Data

(60) Provisional application No. 61/253,778, filed on Oct. 21, 2009.

(51) Int. Cl.
G06F 12/00 (2006.01)
G06F 17/24 (2006.01)
G06F 17/22 (2006.01)
G06Q 10/10 (2012.01)

(52) U.S. Cl.
CPC ......... *G06F 17/243* (2013.01); *G06F 17/2247* (2013.01); *G06Q 10/10* (2013.01)

(58) Field of Classification Search
CPC .......... G06F 17/2247; G06F 17/2264; G06F 17/243; G06Q 10/103; G06Q 10/10
USPC ................................ 715/221, 224
See application file for complete search history.

(56) References Cited

U.S. PATENT DOCUMENTS

| 7,171,615 | B2 | 1/2007 | Jensen et al. | |
| 7,523,391 | B1 | 4/2009 | Eizenhoefer | |
| 8,065,527 | B2* | 11/2011 | Veluchamy | G06F 17/243 382/119 |
| 8,655,961 | B2* | 2/2014 | McCabe | G06F 21/64 709/206 |
| 8,949,708 | B2* | 2/2015 | Peterson | G06F 21/645 715/234 |
| 2002/0174010 | A1* | 11/2002 | Rice, III | 705/14 |
| 2004/0225884 | A1* | 11/2004 | Lorenzini | H04L 9/3247 713/176 |
| 2004/0267813 | A1 | 12/2004 | Rivers-Moore et al. | |
| 2005/0198563 | A1* | 9/2005 | Kristjansson | 715/507 |
| 2005/0216742 | A1* | 9/2005 | Wong | H04L 9/3247 713/176 |
| 2006/0259440 | A1* | 11/2006 | Leake | G06Q 20/3821 705/76 |
| 2007/0079139 | A1* | 4/2007 | Kim | G06F 21/64 713/186 |
| 2008/0177718 | A1 | 7/2008 | Hasson et al. | |
| 2008/0209313 | A1* | 8/2008 | Gonser | 715/255 |
| 2008/0215976 | A1* | 9/2008 | Bierner et al. | 715/708 |
| 2008/0235577 | A1* | 9/2008 | Veluchamy | G06F 17/243 715/268 |
| 2008/0313529 | A1 | 12/2008 | Gwozdz et al. | |
| 2009/0024912 | A1* | 1/2009 | McCabe et al. | 715/224 |

(Continued)

OTHER PUBLICATIONS

Pietschmann, "JavaScript: Loop through all elements in a form", 4 pages (2006), available at http://pietschsoft.com/post/2006/06/01/Javascript-Loop-through-all-elements-in-a-form.aspx.*

(Continued)

*Primary Examiner* — Maikhanh Nguyen
(74) *Attorney, Agent, or Firm* — BainwoodHuang

(57) ABSTRACT

A system and method for facilitating the entry by a user via a network, of information into a scaffold electronic document. A flag server modifies the scaffold electronic document to include user-entered information in a information entry field and displays a graphic flag at a next one of a succession of information entry fields.

13 Claims, 27 Drawing Sheets

(56) References Cited

U.S. PATENT DOCUMENTS

| | | | | |
|---|---|---|---|---|
| 2009/0292786 | A1* | 11/2009 | McCabe | G06F 21/64 709/206 |
| 2010/0235727 | A1* | 9/2010 | Ashton | G06Q 10/10 715/253 |
| 2011/0179289 | A1* | 7/2011 | Guenther | 713/189 |
| 2011/0314371 | A1* | 12/2011 | Peterson | G06F 21/645 715/234 |
| 2013/0050512 | A1* | 2/2013 | Gonser | H04N 1/00424 348/207.1 |
| 2013/0263283 | A1* | 10/2013 | Peterson | G06F 21/6218 726/28 |

OTHER PUBLICATIONS

Herzberg et al. "Surf'N'Sign: Client Signatures on Web Documents", 1998, IEEE, p. 61-71.*

Borozdin, "DocuSign Connect Service Guide," DocuSign Inc, 2008, pp. 1-9.*

Kwork et al, "An Automatic Electronic Contract Document Signing System in a Secure Environment," IEEE, 2005.*

* cited by examiner

| Sign Document | YOUR PROGRESS: 0% |
|---|---|

You have 1 item to fill-in on Page 1

**MUTUAL
NON-DISCLOSURE AGREEMENT**

THIS AGREEMENT, made this ____ day of ____, 2008 ("Effective Date") by and between ____, a ____ Corporation, having a principal place of business at ____ (hereinafter "Party One"), and _____ having a principal place of business (hereinafter "disclosee").

▶ REQUIRED

WHEREAS, both Parties intend to disclose to each other proprietary/company-confidential information for the purpose of discussing mutual business development opportunities and potential teaming agreements which may result in a Teaming Agreement for Party One and it's technology, products and services.

X _____    SUBMIT SIGNATURE

---

GUID: XYRUIEDJDOLGHSDHFK
Subject: Please sign this NDA
Message: Please sign this document CC  Daryl Bern
    daryl@bern.com 🖋 Julie Santos
    Julie@santos.com 🖋 Martin Santos
    martin@santos.com Sent            Expires
10/10/2010      10/11/2010

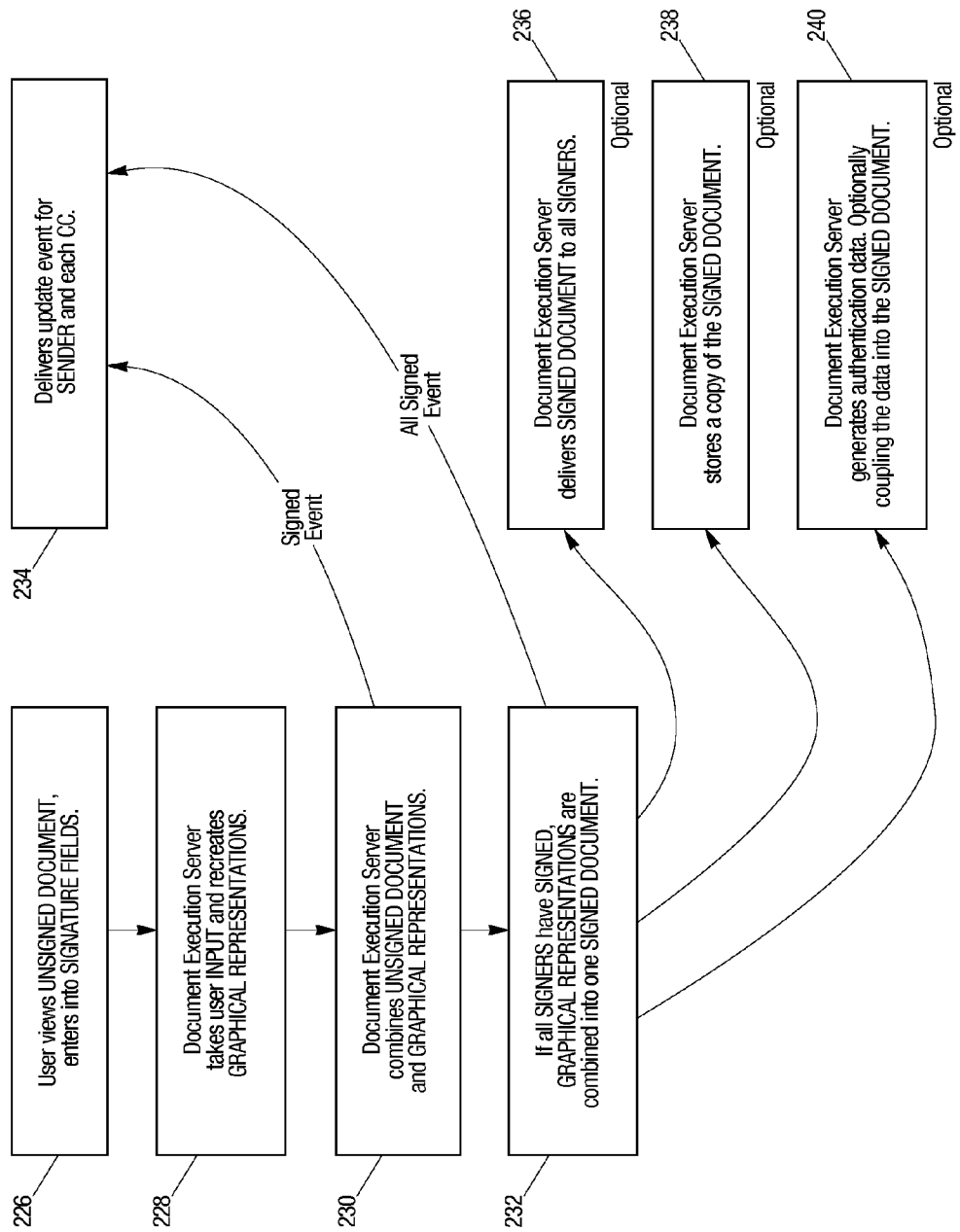

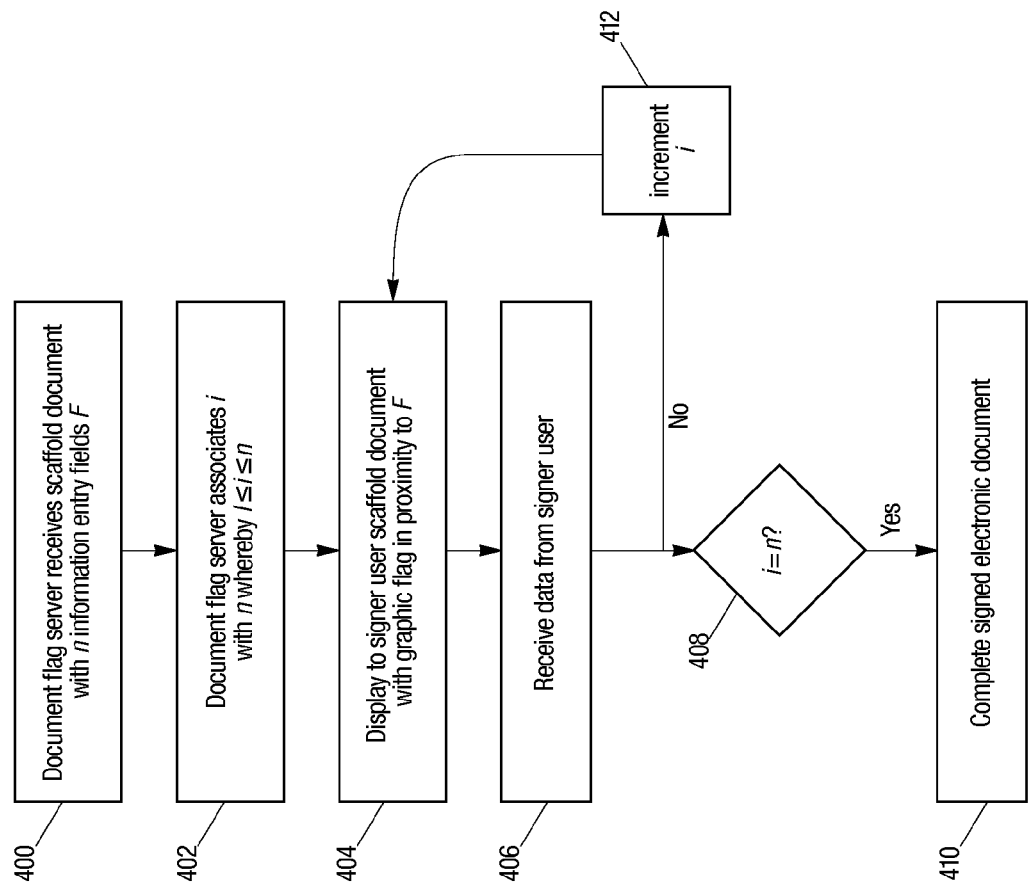

FLAG USER-1xxxxxxxxx [ user-l 1   ] xxxxxxxxxxxx [ user-2   ] xxxxxxx
xxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxx
xxxxxxxxxxxxxxxxxxxxxxxxxxxxxxxxxxxxxxxxxx
xxxxxxxxxxxxxxxxxxxxxxxxxxxxxxxxxxxxxxxx
xxxxxxxxxxxxxxxxxxxxxxxxxxxxxxxxxxxxx
xxxxxxxxxxxxxxxxxxxxxxxxxxxxxxxxxxxxxxxxxxxxxxxx
xxxxxxxxxxxxxxxx x xxxxxxxxxxxxxxxxxxxxxxxx
xxxxxxxxxxxxxxxxxxxxxxxxxxxxxxxxxxxxxxxxxxxxxxxxxxxxxxxxxx
xxxxxxxxxxxxxxxxxx
FLAG USER-1      xxxxx [ user- 1] xxxxxxxxxxxxxxxxxxxxxxxx xxx
xxxxxxxxxxxxxxxxxxxxxxxxxxxxxxxx[ user- 2   ] xxxxxxxxxxxxxxxxxxxxxxxxx
FLAG USER-1    [_ user-l    ]                           [_ user-2    ]
            Xxxxxxxxxxx                                 xxxxxxxxxxxxxxxxxxx

Fig. 7A

FLAG USER-2xxxxxxxxxx [ user-I 2    ] xxxxxxxxxxxxxx [ user-21    ] xxxxxxxx
xxxxxxxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxxxxxxxx
xxxxxxxxxxxxxxxxx xxxxxxxxxxxxxxxxxxxxxxxxxxxxxxxxxxxxxxxxxxxxxxxxxxxxx
xxxxxxxxxxxxxxxxxxx x xxxxxxxxxxxxxxxxxxxx
FLAG USER-2      xxxxx [ user- 2]xxxxxxxxxxxxxxxx[ user- 1    ]xxxxxxxxxxxxxxxxxxxxxxxx xxx
xxxxxxxxxxxxxxxxxxxxxxxxxxxxxxxxxxxxxxxxxxxxxxxxxxxxxxxx
FLAG USER-2      [_ user-I    ]                          [    user-2       ]
                 Xxxxxxxxxxxxx                           xxxxxxxxxxxxxxxxxxxxxx

Fig. 7B

| Send Document | | | |
|---|---|---|---|
| | | | OTHER DOCUMENT TYPES |
| Choose a Document | | | |
| | BROWSE | LIBRARY | |
| | GOOGLE DOCS | | |
| People Involved | | | |
| | ✒ Martin Santos | martin@santos.com | |
| | ✒ Jul| | | |
| Description | | | |
| | | | |
| | | | NEXT STEP |

Expires in     30 Days

Signature Locations and Form Fields     ON

Signer Sequencing     ON

Add ags     OFF

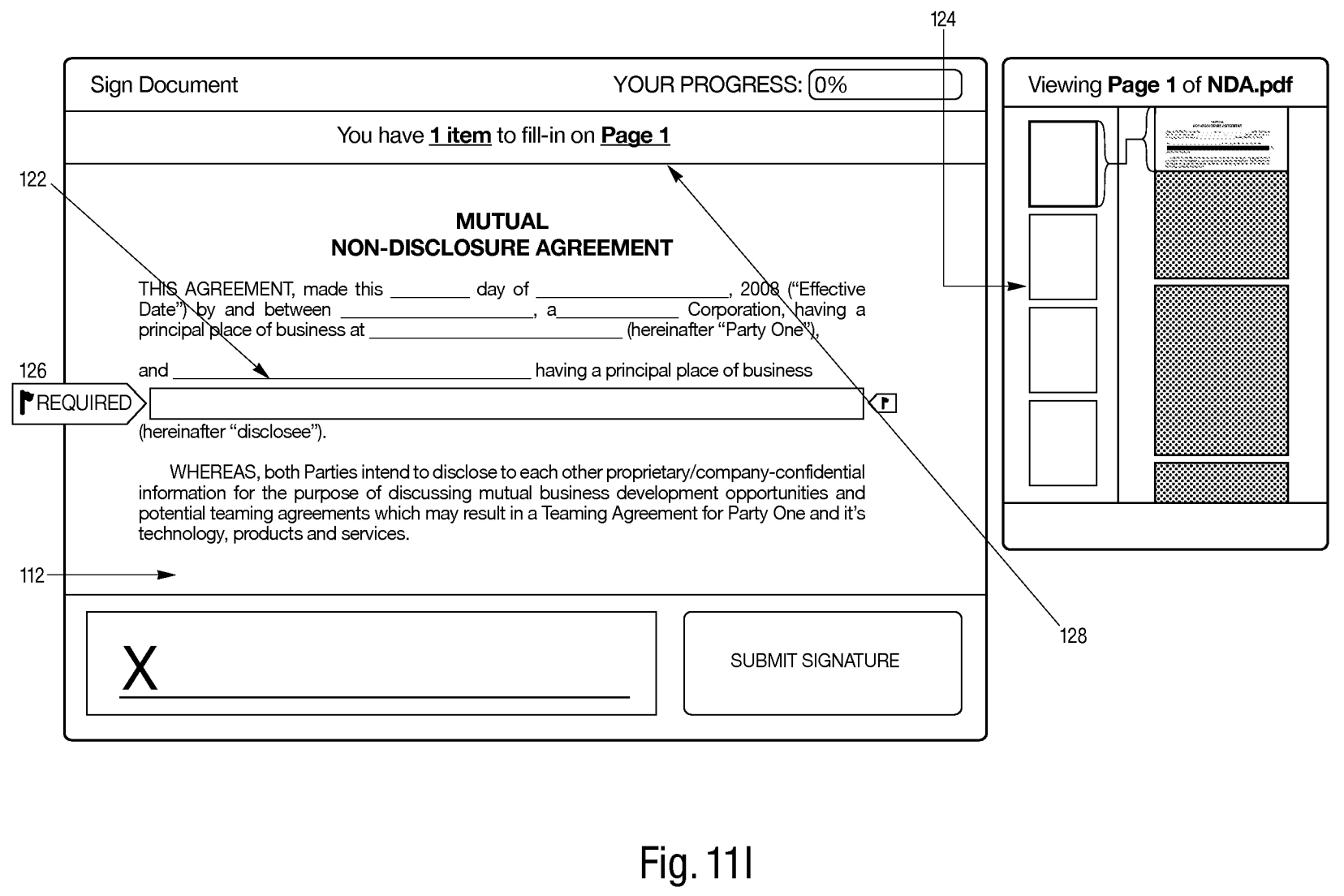

Sign Document    YOUR PROGRESS: 0%

You have 1 item to fill-in on Page 1

**MUTUAL
NON-DISCLOSURE AGREEMENT**

THIS AGREEMENT, made this _____ day of _____, 2008 ("Effective Date") by and between _____, a _____ Corporation, having a principal place of business at _____ (hereinafter "Party One"), and _____ having a principal place of business (hereinafter "disclosee").

▶ REQUIRED

WHEREAS, both Parties intend to disclose to each other proprietary/company-confidential information for the purpose of discussing mutual business development opportunities and potential teaming agreements which may result in a Teaming Agreement for Party One and it's technology, products and services.

X _____    SUBMIT SIGNATURE

Viewing Page 1 of NDA.pdf

Fig. 11I

FORM COMPLETION RATE ENHANCEMENT SYSTEM AND METHOD

REFERENCE TO RELATED APPLICATIONS

This application is related to U.S. provisional patent application Ser. No. 61/253,778, filed Oct. 21, 2009, entitled "Improved Systems and Methods for Document Signing"; U.S. patent application Ser. No. 12/908,827, filed on even date herewith, entitled "Document Signing Systems and Methods," U.S. patent application Ser. No. 12/908,840, filed on even date herewith, entitled "Computer Form Action Zone Summary System and Method," all of which are fully incorporated by reference herein.

FIELD

The present system and method relates to systems and methods for facilitating the completion of electronic scaffold documents, such as forms, by signer users.

BACKGROUND

Businesses and individuals rely on legally executed documents in a variety of contexts, from completion of complex forms used by governments and institutions (e.g., insurance forms, car loan and purchase forms, and the like), to simple contracts between individuals (e.g., lease agreements, wills, and a host of miscellaneous arrangements), with a range of contracts in between.

Documents signed by overnight envelope take a minimum of one day to reach the recipient and an additional day to be returned. Due to intra-office distribution delays and recipients' tendency to put paper documents in to-do piles, the average cycle time using overnight envelopes is 5-7 days. Documents signed by fax have an average cycle time of 2-3 days, due to intra-office delays, procrastination of paper document tasks, and fax machine mishaps. Faced with the burden of signing a paper document and returning it by fax, scan, or mail, many recipients put it down on their desk and forget about it.

As a result, users are increasingly turning to exchanging executed documents online. These documents not only include a field for including a signature, such as the type described above, but may be more complex to include additional fields that may require the signer to initial, sign, or take some other action. However, in a large document, signers may easily lose track of how many such fields they are required to complete (i.e., sign, initial, fill with data), and how many they already have completed. Thus, when users of an online document exchange program encounter problems, such as a signer not completing a document, or a signer not understanding what actions are required, they turn to customer support. This not only slows down the completion progress of a signing event, but also increases the load on customer support.

For such complex electronic documents, signer users typically are provided with limited guidance. The signer user is expected to use general navigation techniques, such as scrollbars, arrow keys, tab buttons, and the like, to move from one information field to the next. Many users, even in this age of computer technology, are relatively unsophisticated with respect to navigating through electronic documents, and relying solely on general-purpose navigation techniques makes form-filling a tedious, lengthy process. This often is compounded by complicated and poorly designed forms. Thus, there remains a need for a system and method to facilitate completion of electronic documents, particularly complex documents with multiple information entry fields.

SUMMARY

The present system and method is directed to facilitating completion of an electronic document via a signer user over the internet or similar network. Generally, the present method is for facilitating the entry by a user, of information into a scaffold electronic document, wherein the scaffold electronic document includes content displayable to a user as text and/or graphics on one or more pages. The electronic document includes n information entry fields associated with the user at one or more locations in the pages, where $n \geq 1$, and where the n information entry fields are adapted to receive information entered therein by the user.

The present system includes a document flag server, that provides data representative of the scaffold electronic document, and establishes an index i associated with the respective n information entry fields, where $1 \leq i \leq n+1$, where i has an initial value equal to 1 for the scaffold electronic document. The document flag server makes available over a network (e.g., the internet or other available network) for display to the user: (i) the scaffold electronic document; and (ii) a graphic flag displayable to the user in conjunction with the display of the scaffold electronic document, with the flag being in proximity to the $i^{th}$ information entry field. The flag indicates to the user that the $i^{th}$ information entry field requires completion.

In response to receipt over the network of data indicative of entry by the user of information into the $i^{th}$ information entry field, the document flag server modifies the scaffold electronic document to include the user-entered information in the $i^{th}$ information entry field, and increments the index i, thus relocating the graphic flag to the next information entry field. These steps are iteratively repeated in succession until $i=n+1$.

In alternative embodiments, the flags are successively located in the document with increasing index i, the flags are located in the document independent of the index i, the flags are located in the document in a sender-determined order, or the flags are located in the document in a third party-determined order. Thus, although the flags may move sequentially through the document, they may move to information entry fields within a document at a specified sequence. If there are multiple users of the same scaffold electronic document, the sequence in which the flag moves from one information field to anther may differ for each user.

BRIEF DESCRIPTION OF FIGURES

FIG. 2A is a screen shot of unsigned electronic documents as used in an embodiment of the present system and method.

FIG. 2B is a screen shot of unsigned electronic documents as used in an embodiment of the present system and method.

FIGS. 4A-4C are a flowchart of an embodiment of the present method.

FIG. 6 is a flowchart of an embodiment of the present method.

FIGS. 7A and 7B are graphical representations of screenshots of an embodiment of the present invention.

FIGS. 11A-11M are screenshots of a computer performing the method.

DETAILED DESCRIPTION

Generally, the present system and method are directed to facilitating completion of an electronic document via a signer user over the internet or similar network. In particular, the present system and method facilitates completion of a scaffold electronic document that includes multiple information entry fields, which may include signature fields associated with signature entry pads, which requires completion by a signer user.

Figure 1:
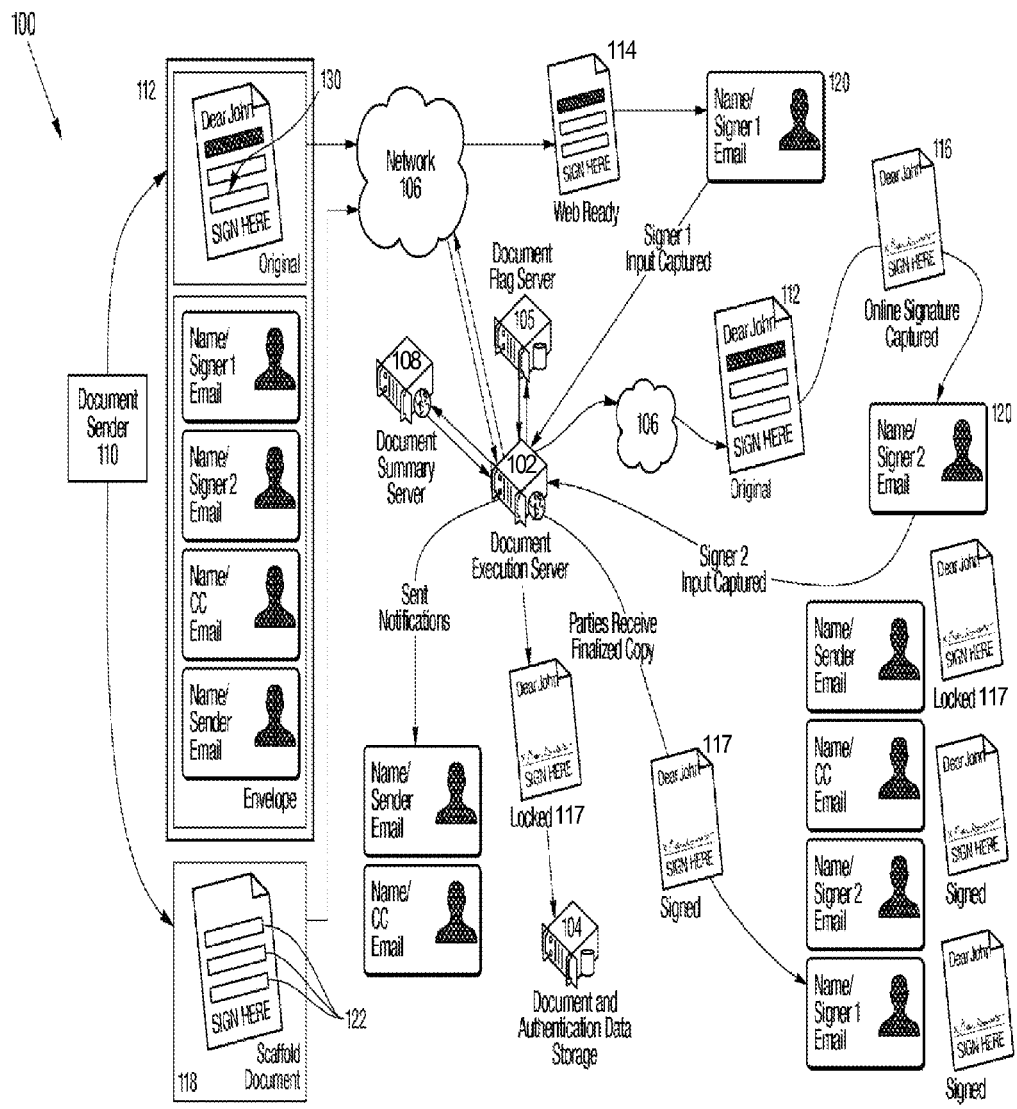
FIG. 1 shows a system chart of an embodiment of the present system.

As shown in FIG. 1, with respect to the signing of an unsigned electronic document, the present system 100 includes a document execution server (DES) 102 in communication with a document and authentication data storage device 104, a document summary server 108, and a document flag server 105. The document execution server 102 is configured to receive over a network 106 from a document sender 110 a scaffold document 118 that contains one or more information entry fields 122, together with additional data representative of the identities of signer users (who are to sign the electronic document) and parties to be copied (the "envelope" information).

As further shown in FIG. 1, the system 100 includes a document summary server 108 is in communication with the document execution server 102, and associated with a scaffold electronic document 118 via network 106, described in further detail below. The document summary server 108 facilitates the entry by a signer user 120 of information into one or more information entry fields 122 in a scaffold document 118.

The system 100 further includes a document flag server 105 in communication with the document execution server 102 and associated scaffold electronic document 118 via network 106, described in further detail below. Referring now to FIG. 1 and FIG. 2A, the document flag server 105 associates one or more flags 126 with signature fields 130 in an unsigned electronic document 112, so that a signer user 120 can easily identify where a signature or other information is required to be entered in the document. In an embodiment, the document execution server 102 obtains flag data from the document flag server 105, and associates a visual flag 126 in a location on the unsigned electronic document 112 with the unsigned electronic document 112 prior to sending the document to a signer user 120.

Figure 2B:
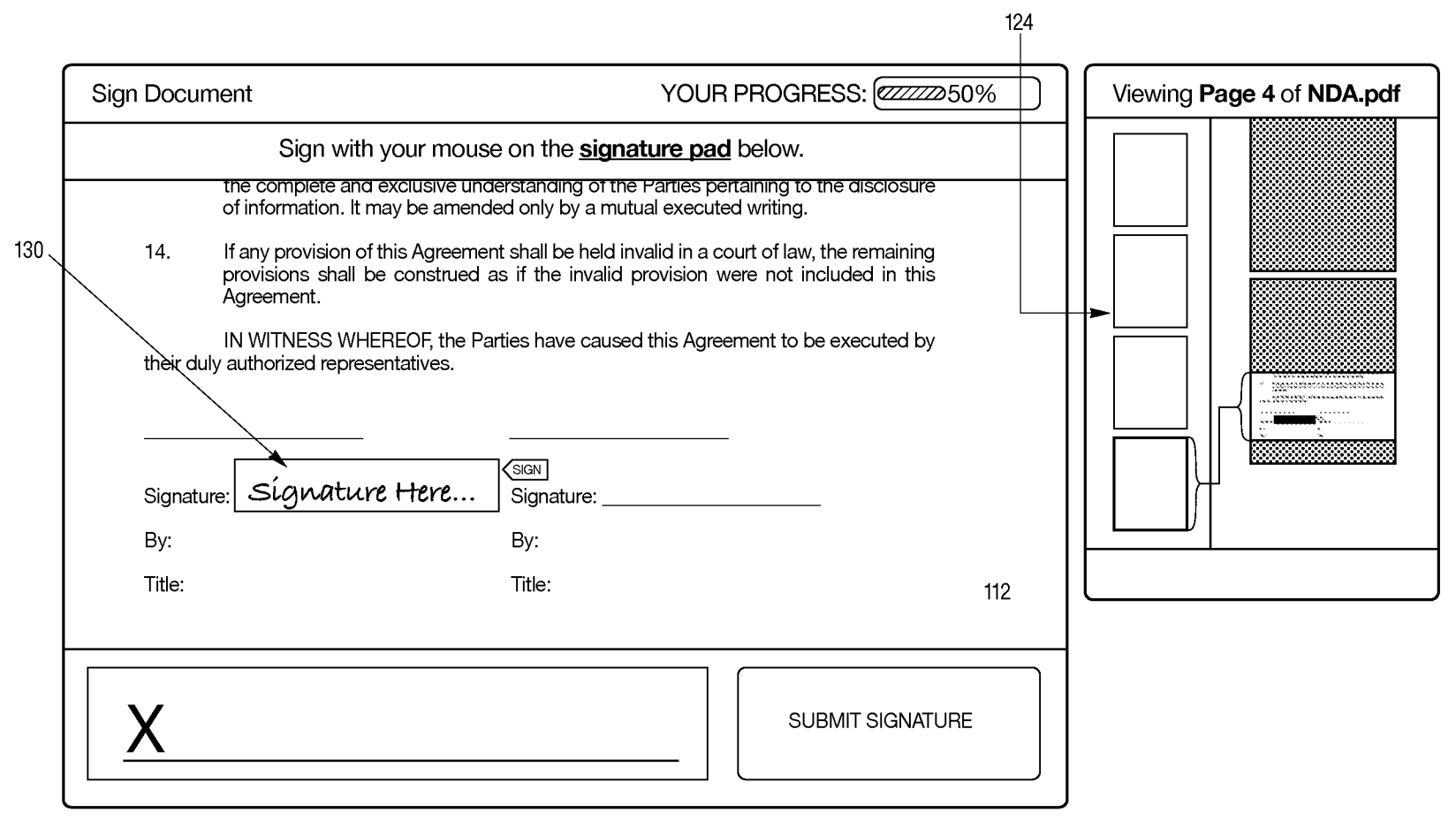

Additionally referring now to FIG. 2B, and returning now to the document execution server 102, that server sends, or otherwise makes available the unsigned electronic document 112, with or without including an information summary indicator 124 from the document summary server 108 and/or a flag 126 from the document flag server 105, to one or more signer users 120, identified by the document sender 110. Once each target signer user 120 completes all designated signature fields for that signer user, the document execution server 102 converts the original unsigned electronic document 112 into a (partially) signed electronic document 116. Once all target signer users 120 have completed all designated signature fields, the input is combined to generate a signed electronic document 117. The signed electronic document 117 may be logged and stored in the document and authentication data storage device 104 for future use of the target document signed electronic document is made available to each of the signer users and the copied parties.

The document execution server 102 may send notifications to the document sender 110 as well as other designated signer users 120, indicating the progress of the signing activity. For example, the notifications may identify signature fields in the electronic document still requiring entry of data by one or more of the signer users.

FIG. 2A shows an example screenshot of an unsigned electronic document 112 with a graphical flag 126 in the left margin of the screen displaying the document. In that embodiment, the flag is a brightly-colored "tab" that includes the text "required", to identify for the signer user 120 that there is a signature field 130 along the same visual line on the screen that requires the signer user to complete. In a preferred embodiment, the flags 126 are a graphical equivalent of a sticky label, which appear to stick out of or wrap around the edge of the document as an indicator to the signer user. FIG. 2B shows an example screenshot of an unsigned electronic document 112, having multiple signature fields 130. The unsigned electronic document 112 includes content displayable to a signer user 120 as text, graphics, or a combination of text and graphics. The unsigned electronic document 112 includes one or more signature fields 130, into which data is entered by signer users 120 at one or more locations on the pages of the electronic document 112 using online signature entry pads 132 (shown in FIG. 11K) associated with each signature entry field 130, as described in further detail below. The location, type, and number of signature fields 130 per document are specified by the document sender 110 to the document execution server 102. The document execution server 102 associates the signature fields 130 identified by the document sender 110, and presents the unsigned electronic document 112, including all signature fields 130, to the respective signer users 120 identified by the document sender 110. At the right side of FIG. 2B, the progress in signing (or otherwise completing the signature fields for a signer user) is indicated by an information summary indicator 124, which is shown in this FIG. 2B as a "thermometer-type" graphic. In FIG. 2B, the electronic document 112 is shown for a Chief Executive Officer signer user, displaying a signature field 130.

In an alternative embodiment, the document execution server 102 converts the original unsigned electronic document 112 into an unsigned web-ready document 114, having the same information and signature fields 130 as the original document. Unsigned web-ready documents are ready for dynamic entry of information into the signature fields 130 by one or more signer users 120. This web-ready conversion of the original documents may be achieved using standard conversion software and algorithms readily available and known to those skilled in the relevant art. For example, a Microsoft Word Document can be opened in the OpenOffice Application, exported as a PDF and then, using pdf2swf from SWFTOOLS.org, exported in Flash format, which readily is displayable in most generally commercially available web browsers. In an alternative embodiment, the unsigned electronic document 112 is exported using similar tools into PNG files, which are supported by commercially available web browsers, and which technology is available in services such as DOCSTOC.com and SCRIBD.com.

After receiving the original unsigned electronic document 112 and, as applicable, converting the document to an unsigned web-ready document 114, the document execution server 102 makes available, via a network, either the original, unsigned electronic document 112 or the unsigned web-ready document 114 to a signer user 120, together with an online signature entry pad 132 associated with each signature field 130 in the unsigned electronic document 112. In an embodiment, the document execution server 102 makes the unsigned electronic document 112 available to multiple signer users 120, either simultaneously or serially, depending on instructions from the document sender 110, or other external, predetermined parameters and input. In an alternative embodiment, the document execution server 102 delivers the unsigned electronic document 112 via an application programming interface (API) for access by predetermined signer users.

Alternatively, also as shown in FIG. 1, the document summary server 108 may send a scaffold document 118 via email or other electronic transmission to one or more signer users 120. The same scaffold document 118 is made available to multiple signer users 120 either in a web ready format, via email, via a link through an API, or using other electronic means, as may be desirable for each signer user 120, as is the case with any unsigned electronic document.

Figure 3:
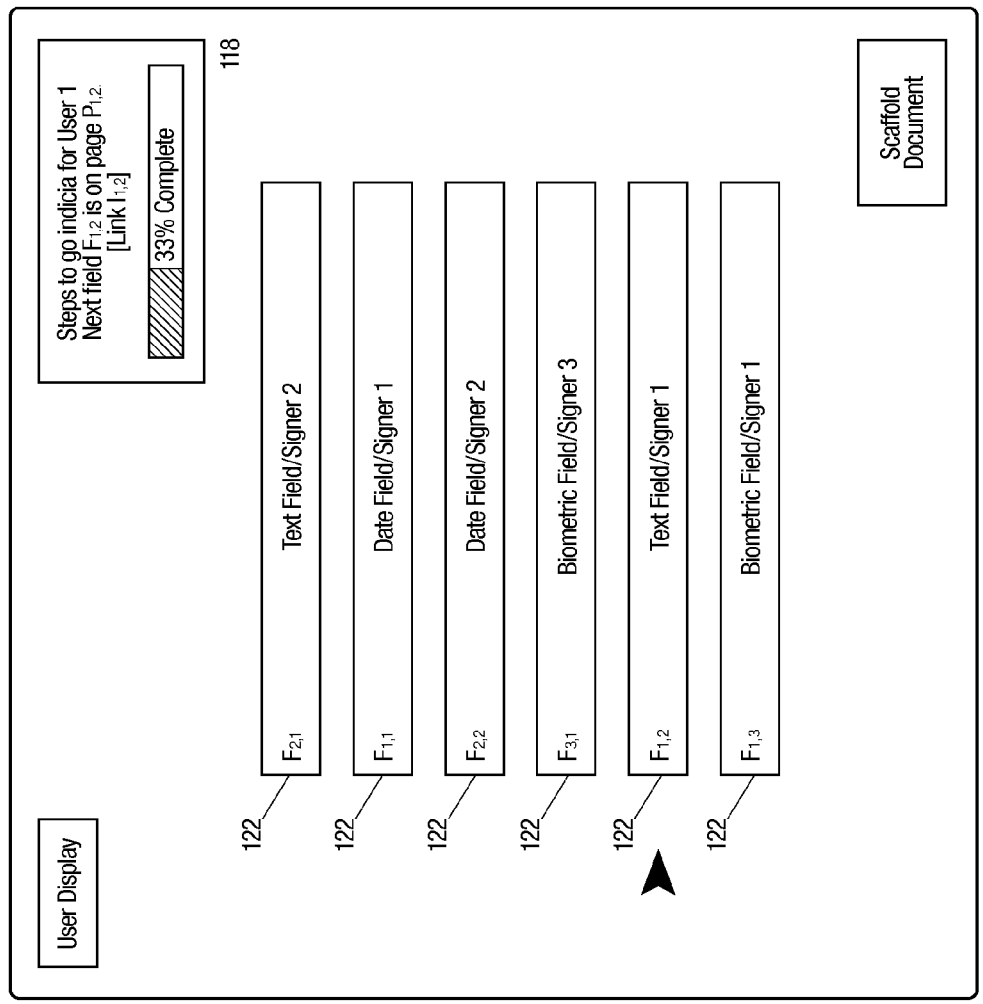
FIG. 3 is a screen shot of an unsigned electronic document as used in an embodiment of the present system and method.

FIG. 3 shows an embodiment of an electronic scaffold document 118 of the present system and method. As shown, the scaffold document 118 includes multiple and different fields F for the $i^{th}$ user $U_i$. In this illustrated embodiment, the document sender 110 designates a number of text fields, date fields, biometric fields, or others that are associated with each signer user 120. In the example, there are three signer users m=3. For the first signer user $U_1$, there are three fields to fill (n=3). Thus, $F_{2,1}$ corresponds to the first signature field 130 for the second signer user 120. Similarly, $F_{1,1}$ corresponds to the first signature field 130 for the first signer user 120, and so forth.

In response to receipt of the signature data from one or more of the signer users 120, the document execution server 102 generates a signed (or otherwise "filled-in" or completed) electronic document 117 corresponding to the unsigned electronic document 118 and including the signature data.

In an embodiment, the signed electronic document 117 then is made available by the document execution server 102 to all or a predetermined subset of the signer users 120 and to the document sender 110 for verification, confirmation, and other predetermined actions. In an embodiment, the document execution server 102 transmits the signed (or otherwise completed) electronic document 117 (in a "locked" form) to a document and authentication data storage device 104.

As used herein, a signer user 102 may be the document sender or one or more third parties. In addition, the term "signature field", as used herein, includes entry fields for information or data that may include signatures, signer name, unique signer identifiers, signature initials, addresses, or any other information that a document sender may identify as being acceptable forms of information for a particular signature field. For example, in one real estate transaction document, one signature field type may require entry of the signer user's full, legal name, another signature field type may require entry of the target real property address, another signature field type may include date data, and such.

In addition, the term "signature" includes any biometric action by a signer user, such as: freehand motion using a mouse, electronic pen, touch-screen, or any other method for detecting and recording (either temporarily or in a stored location) graphics unique or capable of being associated with a particular signer user. It may also include iris or other eye scan data, fingerprints, vocal sound or voiceprints, or other available biometrics. The freehand motion may either approximate, electronically, the signer user's traditional signature (i.e., as performed with a pen or pencil on paper), or may be a graphic that is quite dissimilar from the signer user's traditional signature.

In an embodiment, the document summary server 108 establishes a group index i for each of the m groups of information entry fields F 122. For purposes of this document, we use the following definitions. With respect to signer users 120, m=number of users/groups of user fields, (e.g. the number of participant signer users), wherein $1<=i<=m$. In addition, $U_i$ represents the $i^{th}$ signer user. In referencing signature field groups for a signer user, $F_i$ is the group of fields required to be "filled in" by the signer user $U_i$, i.e., for the $i^{th}$ signer user. $I_i$ is the incomplete (i.e., not "filled in") required fields for $U_i$. $C_i$ is the required fields completed by $U_i$. When a field $F_{i,j}$ is fully filled in, then $I_{i,j}$ becomes an empty entry which is ignored for counting purposes and skipped when iterating through elements. The same is true for $C_{i,j}$. Counts are represented as: $|F_i|$ is the total required field count for $U_i$; $|I_i|$ is the incomplete required field count for $U_i$; and $|C_i|$ is the completed required field count for $U_i$, all at any given time.

Individual fields are represented as: $F_{i,j}$ is the field j for $U_i$; $P_{i,j}$ is the page number on which $I_{i,j}$ appears; $L_{i,j}$ is the actionable link to bring $F_{i,j}$ to the viewport (for example, if $F_{i,j}$ is offscreen to a signer user 120, clicking a link $L_{i,j}$, will bring $F_{i,j}$ into the middle of the user screen and make the field active for input by the sender user 120; and $Z_{i,j}$ is the visual indicator of next $I_{i,j}$ to be completed by the signer user. Thus, $1<=j<=|F_i|$.

Upon receiving a scaffold document 118, from a document sender 110, the document summary server 108 establishes a group index i for each of the m groups of information entry fields, where $1 \le i \le m$, and establishes a subgroup index $j_i$ for the $i^{th}$ group of information entry fields $I_{i,j_i}$ of the respective m groups, where $1 \le i \le m$ and where $1 \le j_i \le n_i$, wherein i and $j_i$ for the $i^{th}$ user have initial values equal to 1 for the scaffold electronic document, and i and $j_i$ have maximum values equal to m and $n_i$ respectively for the scaffold electronic document. The document summary server 108 makes available over the network 106, a version of the scaffold document 118 to one or more signer users 120. The scaffold document 118 is displayable to each signer user 120 to allow the signer user 120 to identify the information entry fields 122. As used herein, the term "information entry field" has the same meaning as "signature field"; however, for purposes of clarity, the term "information entry fields" is used in reference to scaffold documents, and the term "signature fields" is used in reference to any unsigned electronic document.

Figure 4A:
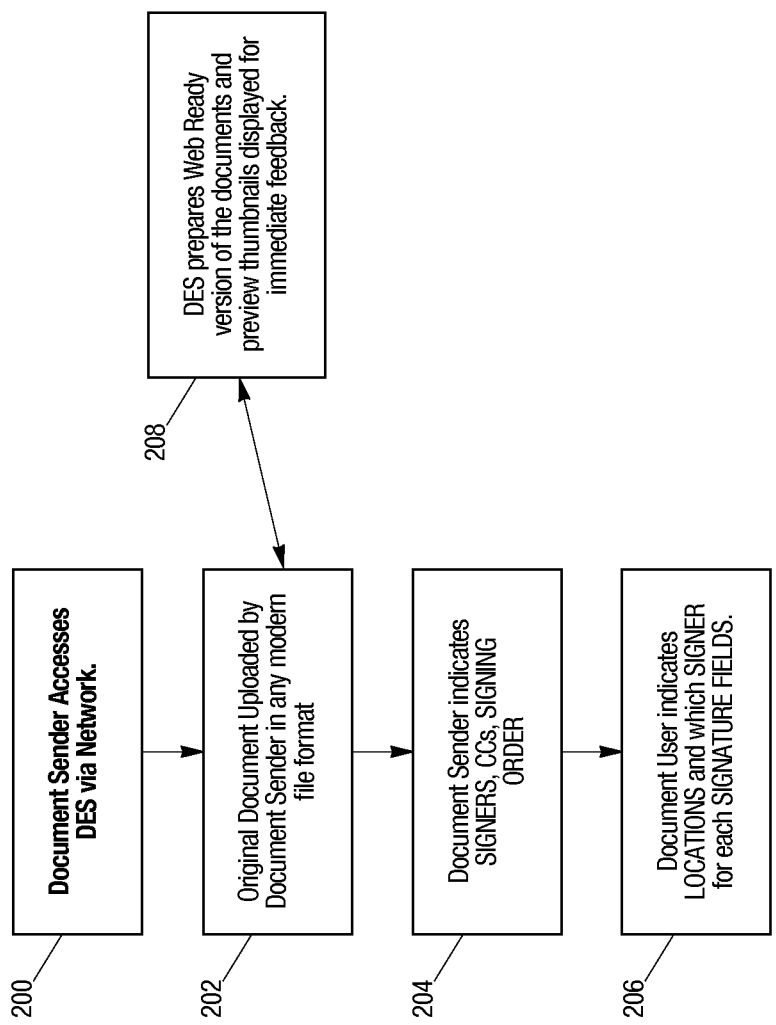

The flowchart of FIG. 4A further illustrates an embodiment of the present method. As shown, a document sender accesses 200 the document execution server 102 via a network, such as the internet. The document sender then uploads 202 the original electronic document to the document execution server (DES). The document sender then indicates 204 the name and contact information of each signer user, each entity that will receive a copy of either the unsigned electronic document and/or the signed electronic document, and any order in which the signature fields contained in the subject document are to be completed by the designated signer users. The document sender also indicates 206 at this time, the locations of signature fields within the unsigned electronic document, together with instructions regarding which signer user is required to complete which corresponding signature field. With multiple signer users, different signer users generally are required to complete different signature fields, as well as different signature field types. For example, in a real estate transaction, the buyer may be required to provide a signature, a personal address, and a date, whereas an escrow agent may be required to provide a signature, a license number, and financial information.

As shown in FIG. 4A, in an embodiment, the document execution server prepares 208 a web-ready version of the original document. The document execution server also may generate thumbnail displays, flags, or other indicia, associated with the various signature fields for easier review by the signer user and a more expedient signer user completion of the designated signature fields.

Figure 4B:
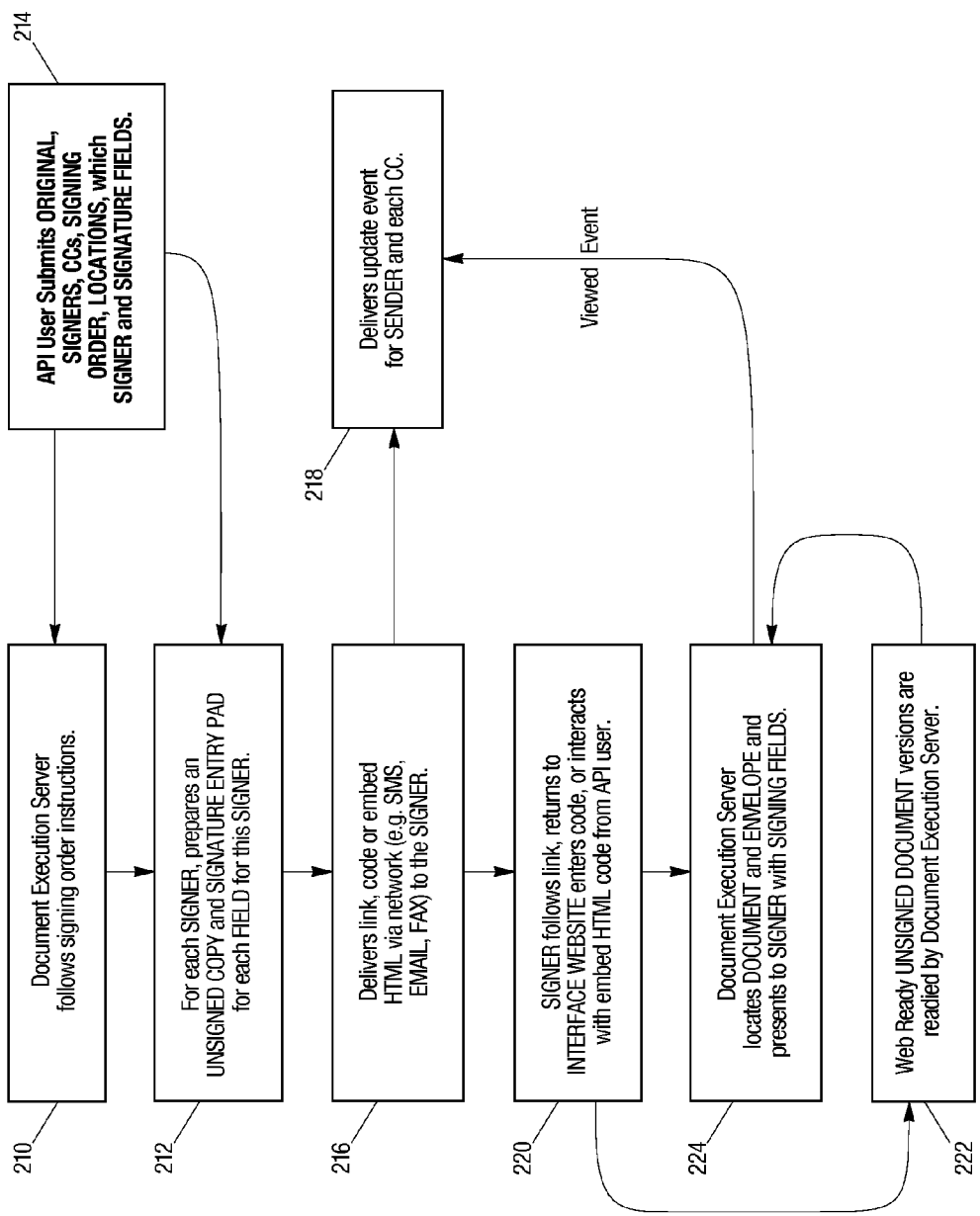

Turning to FIG. 4B, once the document execution server receives the original document, together with the additional document information from the document sender, the document execution server follows 210 the signing order instructions sent by the document sender. For each designated signer user, the document execution server in effect prepares 212 an unsigned electronic document associated with the original document, and a signature entry pad for each signature field. All such information regarding the signer user and instructions related to the document, are collectively referred to the "envelope" of the electronic document. Additional envelope information may include data associated with the identity of the signer user, such as email address, IP address, SMS address, facsimile number, or other electronic forms of address or identification. This envelope is integrally associated with the original document and, as such, remains part of the associated electronic and web-ready versions of the same document as such are generated by the document executive server.

In an alternative embodiment, an API user, such as another internet-based device, is the document sender, which submits 214 the original document, and the associated signer user, copied users, signing order, signature field locations, and signature field authorizations to the document execution server. In an embodiment, the API user receives delivery of the unsigned web-ready documents on behalf of the designated signer users.

Once the unsigned electronic document is prepared, the document execution server delivers 216 an internet link, code, or embedded HTML via a network to the designated signer users. The network includes SMS, email, facsimile, and other available technologies for distributing data. At a proximal time the document execution server in effect transmits the unsigned electronic document to the signer users. The document execution server may deliver updates 218 of the event to the document sender and other designated entities to be copied on such transmission. In this manner, the document sender can begin to track the progress of the document as the designated signer users complete the signature events.

Once the link, code, embedded HTML, or other contact is made by the document execution server to a signer user, that signer user then accesses 220 the unsigned electronic document by following such link, returning to the website interface for the document execution server, interacts with the embedded HTML code from the API user, or otherwise opens the unsigned electronic document. The document execution server locates 224 the unsigned electronic document, together with its associated envelope information, and presents the same to each signer user.

In an embodiment, web ready unsigned document versions are readied at 222 by document execution server 102.

As continued in FIG. 4C, the signer user views 226 the unsigned electronic document, and enters the information requested in each of the signer user's respective signature fields. Information is entered into the signature field by the dynamic online signature entry pad associated with each signature field. Signature entry pads are dynamic fields that appear on the GUI to facilitate signer user entry of information required for the associated signature field. Such information may be entered using a touch pad, mouse, touch-screen, voice entry, and other technologies generally commercially available.

Upon receipt of the entered information, the document execution server creates 228 a graphical representation of the signature field input received from the signer user. The document execution server then (or at desired times) in effect combines 230 the graphical representations with the unsigned electronic document to generate a signed electronic document, to define a signed event. In parallel with receiving the signature field input from the signer users, and with generating each signed electronic document, the document execution server delivers 234 updates on the progress of the signing events to those entities identified as "cc", or copied entities, as well as to the document sender. Once all signers have completed signing the document, all graphical representations of all signature field input received from all signers is combined 232 into a single signed document.

In alternate embodiments, and as shown in FIG. 4C, the document execution server then delivers 236 a copy of the signed electronic document to each of the designated, or selected ones of the signer users associated with that document. In an embodiment, the document execution server optionally locks and stores 238 a copy of the signed electronic document, or may send a copy to a document and authentication data storage device for storage. In an embodiment, the document execution server generates 240 authentication data associated with the signed electronic document. Such authentication data may be data incorporated into the signed electronic document, it may be part of the document envelope, or may be some additional data used only for authentication purposes.

Figure 5:
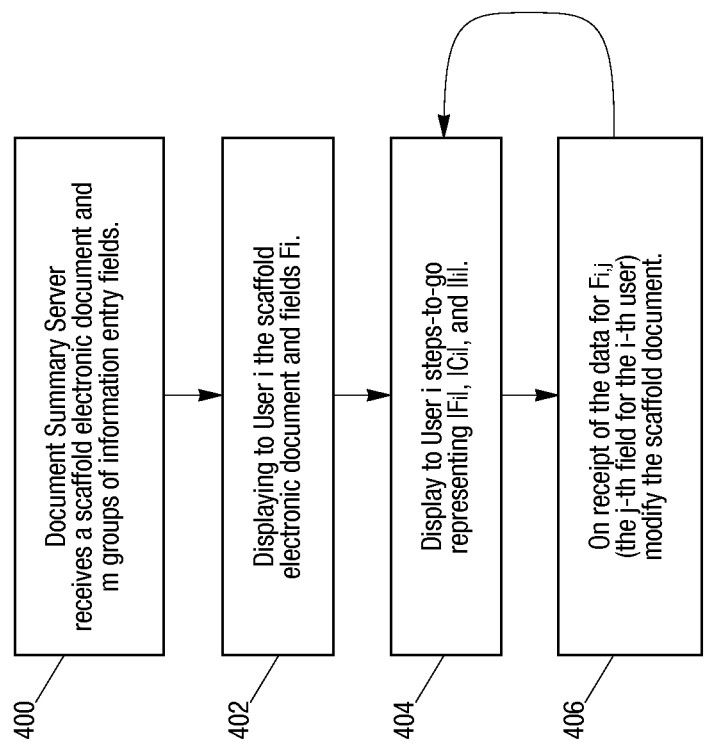
FIG. 5 is a flowchart of an embodiment of the present method.

In an alternative embodiment of the present method in which a document summary server is used, and referring to FIG. 5, once the document summary server receives 400 a scaffold electronic document and m groups of information entry fields, the scaffold and fields $F_i$ then are displayed 402 to a user $U_i$. The display step includes displaying 404 a visual representation of steps-to-go, representing $|F_i|$, $|C_i|$, and $|I_i|$. Such visual representation may be permanent, dynamic representations, such as text, appearing at the top or side of the screens, or user-selective representations, such as text appearing in pull-down menus on the screen. Alternatively, such visual representations may be in the form of dynamic graphical displays, such as a "thermometer"-type graphic, a numerical, button, or other graphic countdown display, color displays, such as red "buttons" representing incomplete information entry fields and green "buttons" representing completed information entry fields. On receipt 406 of data for $F_{i,j}$ (i.e., the $j^{th}$ field for the $i^{th}$ user), the user receives an updated display 404, with the steps-to-go indicator iteratively adjusted to reflect the number of information entry fields remaining to be completed and/or the number of information entry fields completed.

FIG. 6 shows an embodiment of the present method in which flags are associated with information entry fields. As shown in that embodiment, the document flag server receives 400 a scaffold document having n information entry fields $F_1$ to $F_n$. The document flag server associates 402 an index value i with each information entry field in the scaffold electronic document. Index value i is set to equal the value 1, and the unsigned electronic document is displayed 404 to the signer user, which document includes a flag at $F_i$. Data then is received 406 from the signer user. If query 408 whether i=n is resolved in the positive, then the document will be treated as a signed electronic document and the process is complete 410. If query 408 is resolved in the negative, then i is incremented 412 and the unsigned electronic is displayed 404 again to the signer user, again with a flag associated with an information entry field $F_{i+1}$ until all information entry fields are completed by the signer user.

In alternative embodiments, the flags 126 are successively located in the unsigned electronic document 112 with increasing index i, or are located in the unsigned electronic document 112 independent of the index i. In an embodiment, the flags 126 are located in the document based on an order predetermined by a document sender, or document envelope information provided by the document sender to the document execution server. Alternatively, the flags are located in the document based on an order determined by a signer user or a third party.

FIG. 7A shows an exemplary screen display having graphic flags 126 associated with a first user (user 1), $U_1$. The flags 126 are shown in the left margin, indicating that user 1 is required to make an entry in the information entry fields 122 (set off by square brackets) in the lines adjacent to the respective flags 126. In various embodiments, the flags 126 can be in the form of an arrow, an asterisk, or some other icon, and may be in indicative colors to make the flags readily identifiable by the signer user 120.

FIG. 7B shows an exemplary screen display having flags 126 associated with a second user (user 2), $U_2$. The flags 126 in this FIG. 7B are similar to those in FIG. 7A, except that the flags 126 in this FIG. 7B indicate that user 2 is required to make an entry in the information entry fields 122 (set off by square brackets) in the lines adjacent to the respective flags 126.

In alternative embodiments, the flags 126 for $U_1$ and $U_2$ may all appear in the same document, where the flags associated with $U_1$ are a different color or shape than the flags 126 associated with $U_2$. Alternatively, the flags 126 for $U_1$ and $U_2$ may be the same color, but the flags may be specific icons associated with the respective signer users.

In an embodiment having a document with multiple signature fields, the flags 126 may be dynamic, such that they move from signature field-to-signature field as the signer user 120 completes each field. In another embodiment, a page with multiple signature fields 130 may include several flags 126 indicating simultaneously all signature fields 130 on the page. Then, when a signer user 120 completes a signature field 130, the associated flag 126 disappears—all flags 126 disappear once all signature fields 120 in the unsigned electronic document 112 are completed by the signer user 120. In a scaffold document 118, the flags 126 may be different graphical colors or shapes to indicate different information entry fields 122. For example, flags associated with information entry fields requiring name data graphically appear as blue flags, flags associated with information entry fields requiring date data graphically appear as green flags, and the like.

Figure 8:
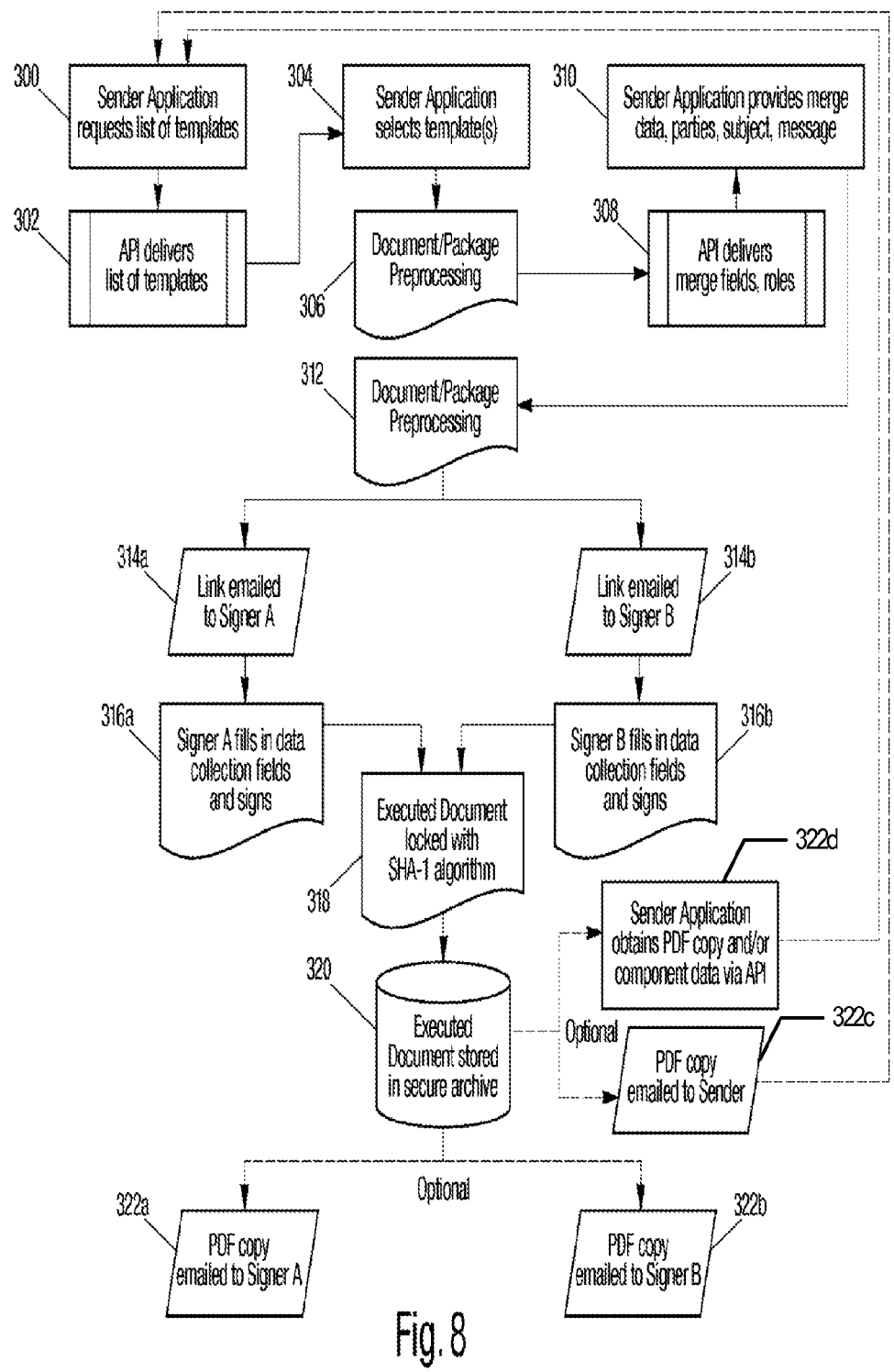
FIG. 8 is a flowchart of an embodiment of the present method.

In an alternative embodiment of the present method, the scaffold document 118 is one selected from predetermined template documents created by third party entities, or the administrator of the present method, and stored in the document execution server for use by customer/document senders via API. In such an embodiment, as shown in FIG. 8, a document sender, or an application used by a document sender, requests 300 a list of template electronic documents. Such template documents have predetermined signature fields, which are not generally changed or changeable by the document sender. An example of such an embodiment would be form lease agreements, or other standard forms.

Upon receiving the request, the document execution server delivers 302 via API, a list of available templates to the sender user. The sender user application selects 304 a template. Upon receipt of the sender user template choice 304, the document execution server performs document package pre-process 306. This pre-process generates a document ID associated with the template. It is possible that many document ID's are associated with each template, and each unique document (having an assigned unique document ID) likely will have a unique envelope. The API then delivers 308 the merge fields and roles associated with the envelope for the designated template. The sender user application provides 310 merge data, information relating to the signer users, and other information and data required for the designated template. In this example, the template is the unsigned electronic document identified and discussed above. The document execution server processes 312 the unsigned template document, in a manner similar to that described above, and sends links 314a, 314b via email to each designated signer user. Each designated signer user provides 316a, 316b the information required for each signature field. Upon receipt of all signature field data, such data is incorporated into an unsigned template document, and the document execution server locks 318 the resulting signed electronic document, as described above in further detail.

At that point, the signed electronic document may be stored 320 in a document and authentication data storage device, and copies of the signed electronic document sent at 322a and 322b, to the document sender at 322c, and others as designated by the document sender at 322d.

In alternate embodiments, sender users select a template unsigned electronic document from a website, from the user's own library, or from secondary sources. Alternatively the step of processing the document 312 is followed by an API delivery of embedded signing codes. In an alternative embodiment, all communications between the document sender and the document execution server, or between the document execution server and one or more of the designated signer users, is via email, facsimile, SMS, and other electronic communications methods generally available.

Figure 9:
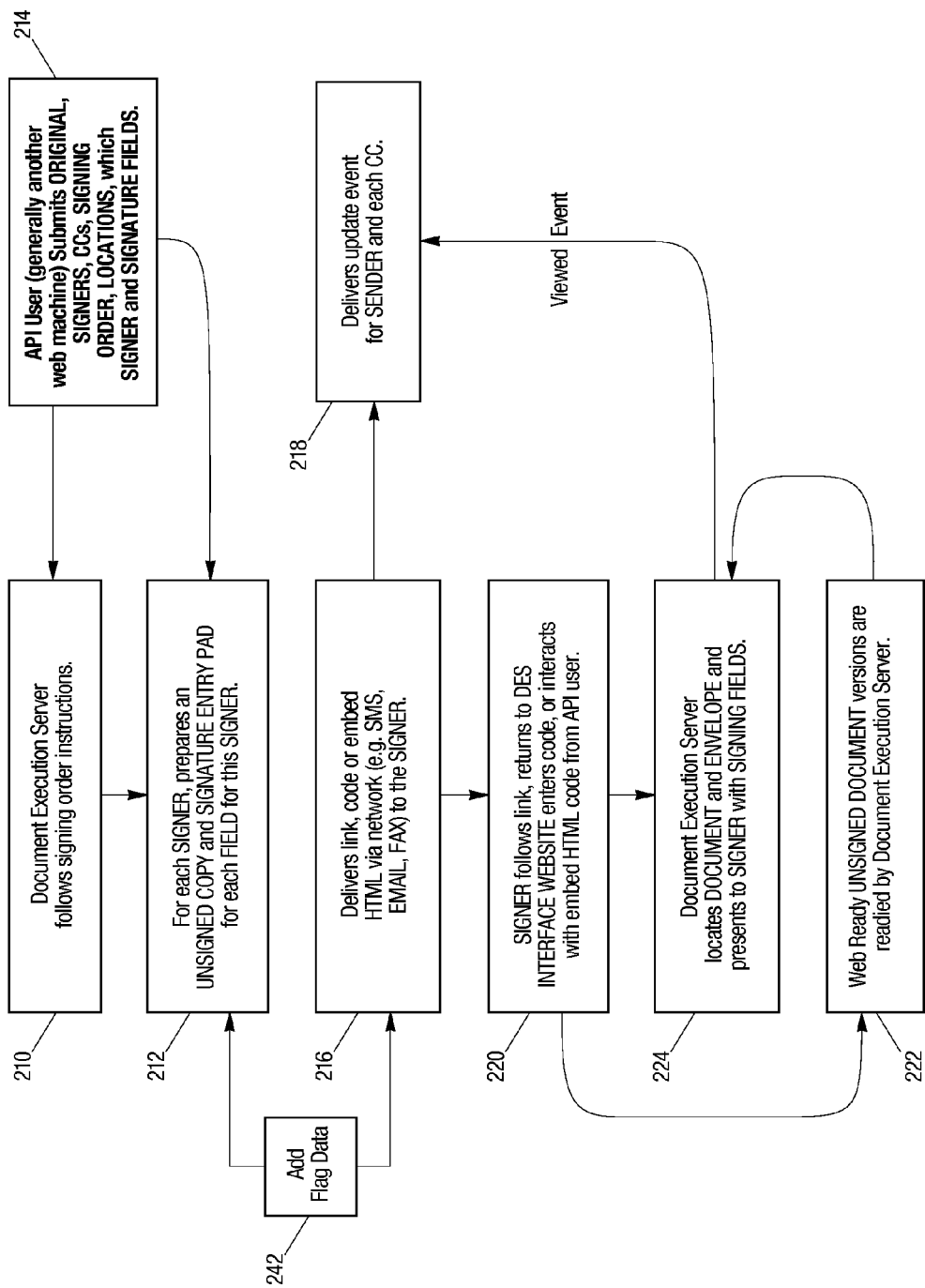
FIG. 9A is a flowchart of an embodiment of the present method.

In an alternative embodiment, as shown in FIG. 9, the document execution server, prior to delivering 216 the unsigned electronic document to the signer user, modifies 242 the unsigned electronic document to include flag data to successively identify to each respective signer user the signature fields in that unsigned electronic document which required data entry. This flag data typically is removed when the document execution server combines 230 the unsigned document and graphical representations of signature field data to create the signed electronic document.

Figure 10:
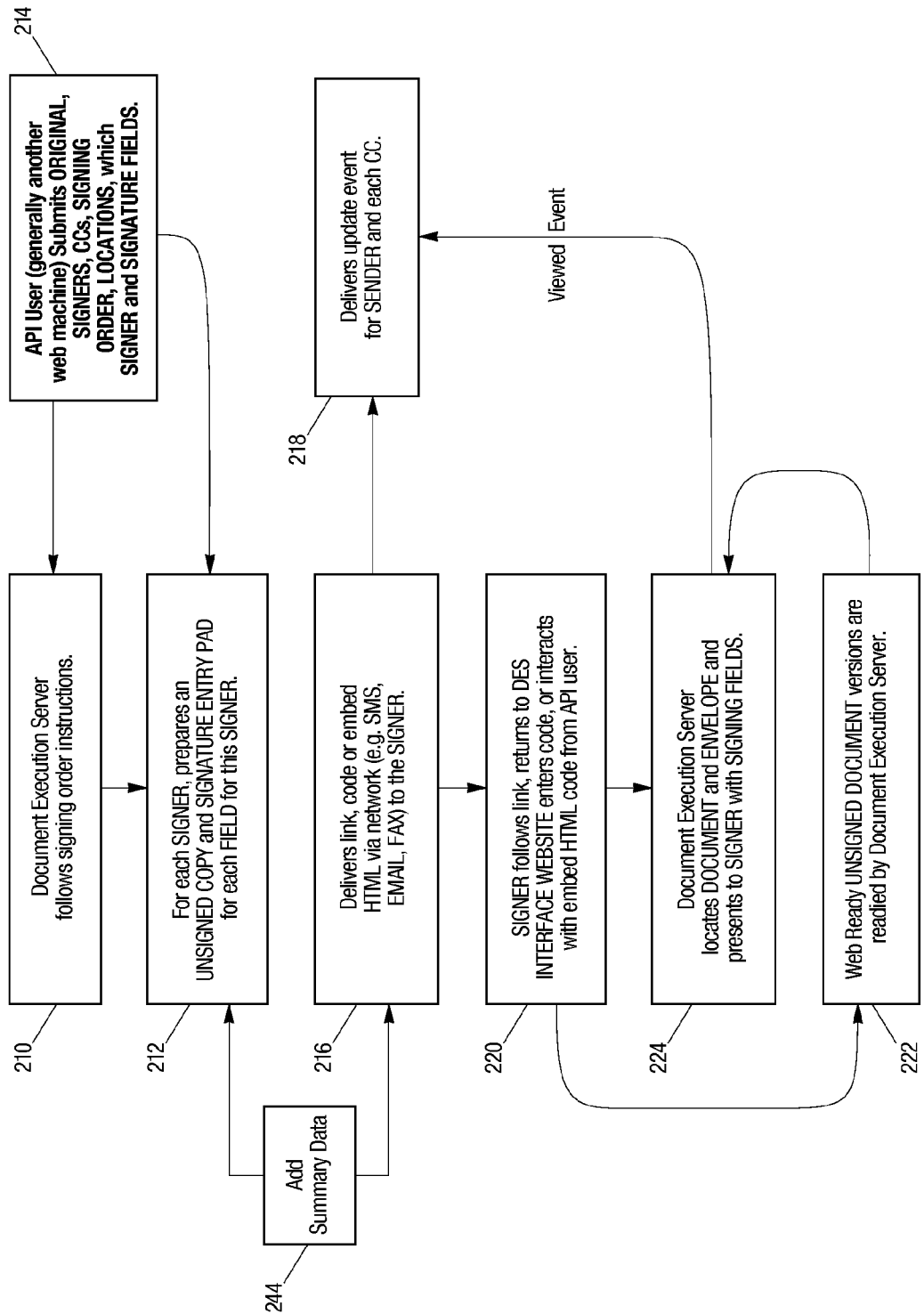
FIG. 10 is a flowchart of an embodiment of the present method.

In an alternative embodiment, as shown in FIG. 10, the document execution server, prior to or contemporaneous with delivering 216 the unsigned electronic document to the signer user, modifies 244 the unsigned electronic document to include summary data, represented by an information summary indicator 124, associated with the document to assist signer users identify the locations of signature fields in the electronic document. Such information summary indicator 124 is presented in a side menu to the document, appears visually on the same page as a signature field, or is presented anywhere on the visual periphery of document pages. The information summary indicator includes such indicators as the total number of signature fields in the subject document, the number of signature fields that have been completed, the number of signature fields remaining to be completed, or any combination of such data. Alternatively, the information summary indicator 124 is presented graphically as a bar, as buttons, as text, as color indicators (e.g., red for incomplete signature fields; green for completed signature fields), and the like. In an embodiment, the information summary indicator 124 is static, by presenting location identification data (e.g., page, paragraph information) associated with each signature field, or by presenting the total number of signature fields contained in the subject document. Alternatively, the information summary indicator 124 is dynamic, changing as the signer user completes each signature field.

Figure 11B:
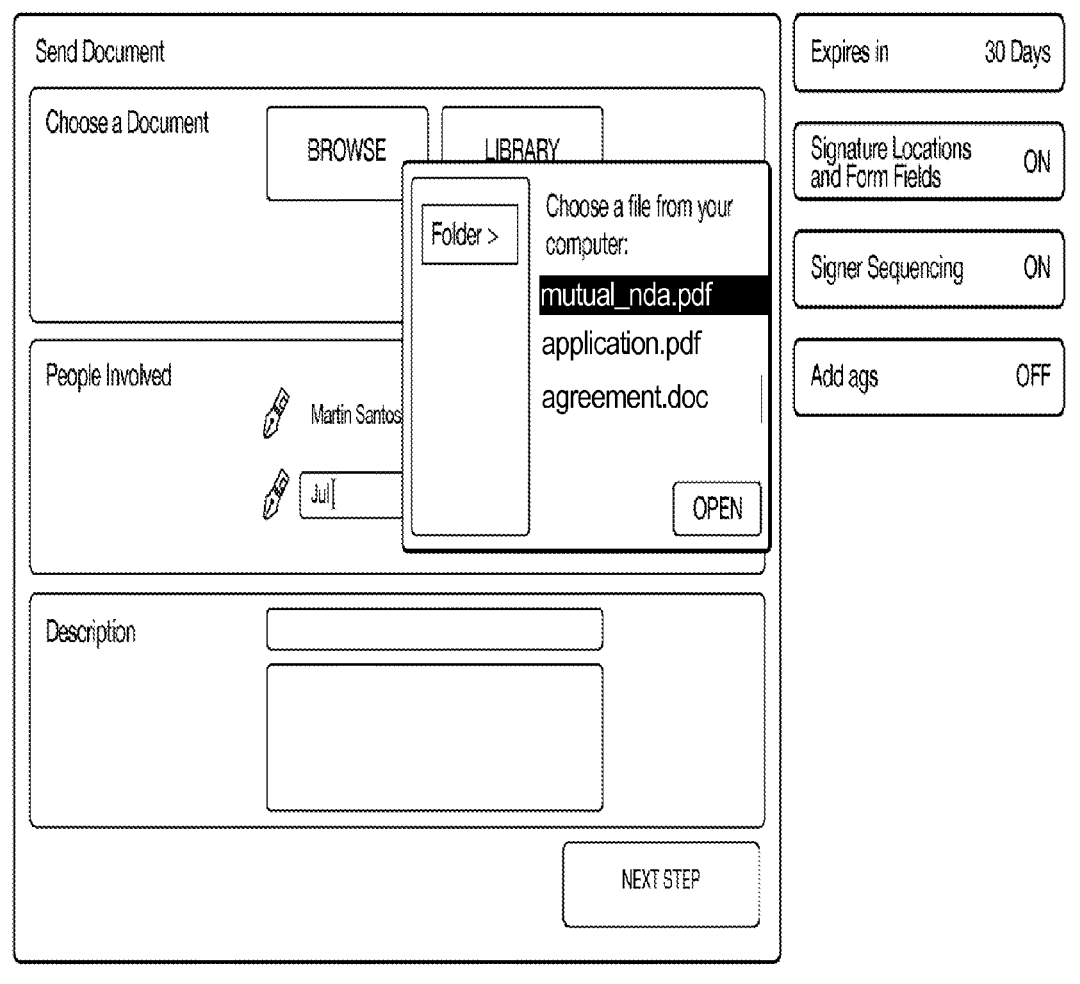
Figure 11C:
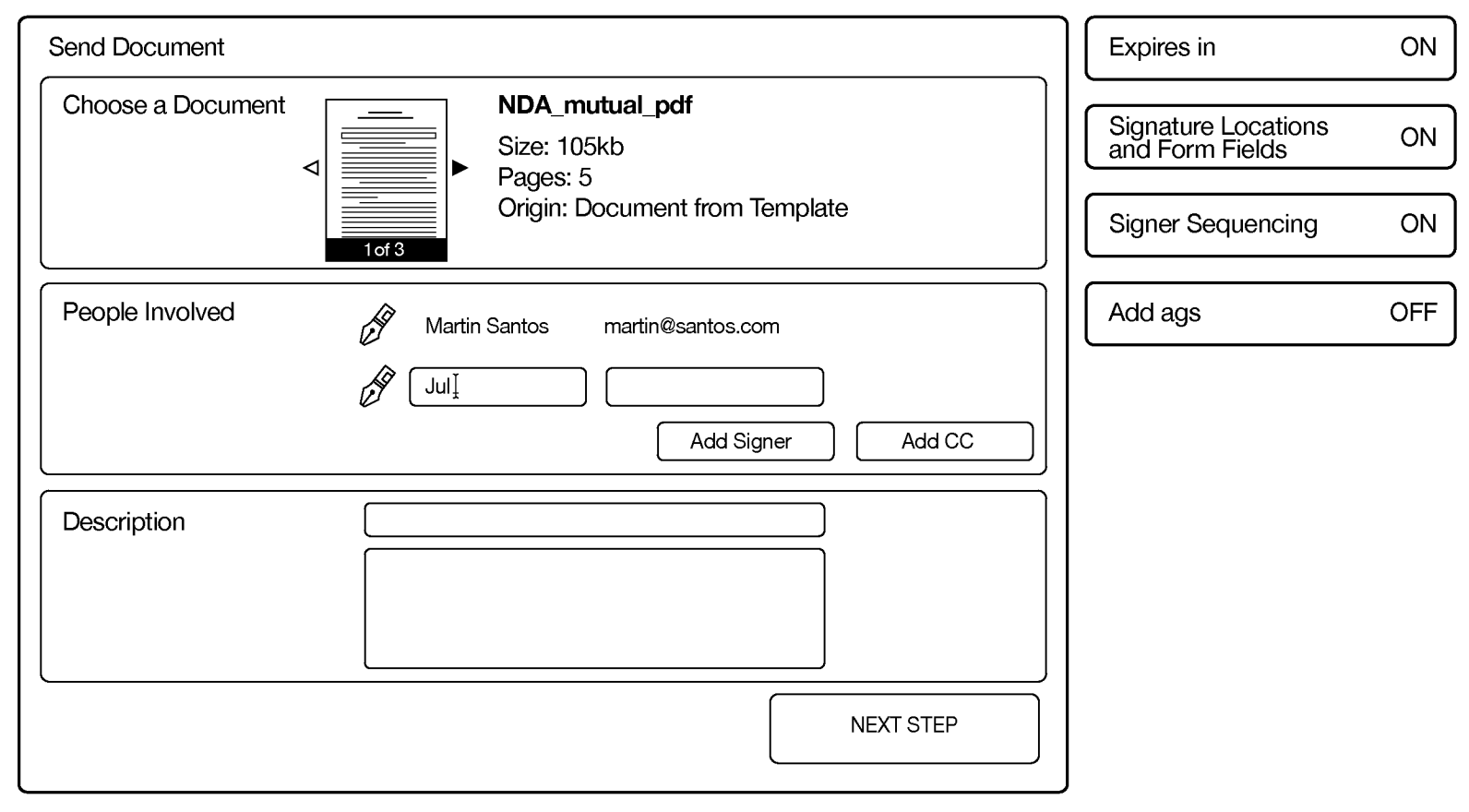
Figure 11D:
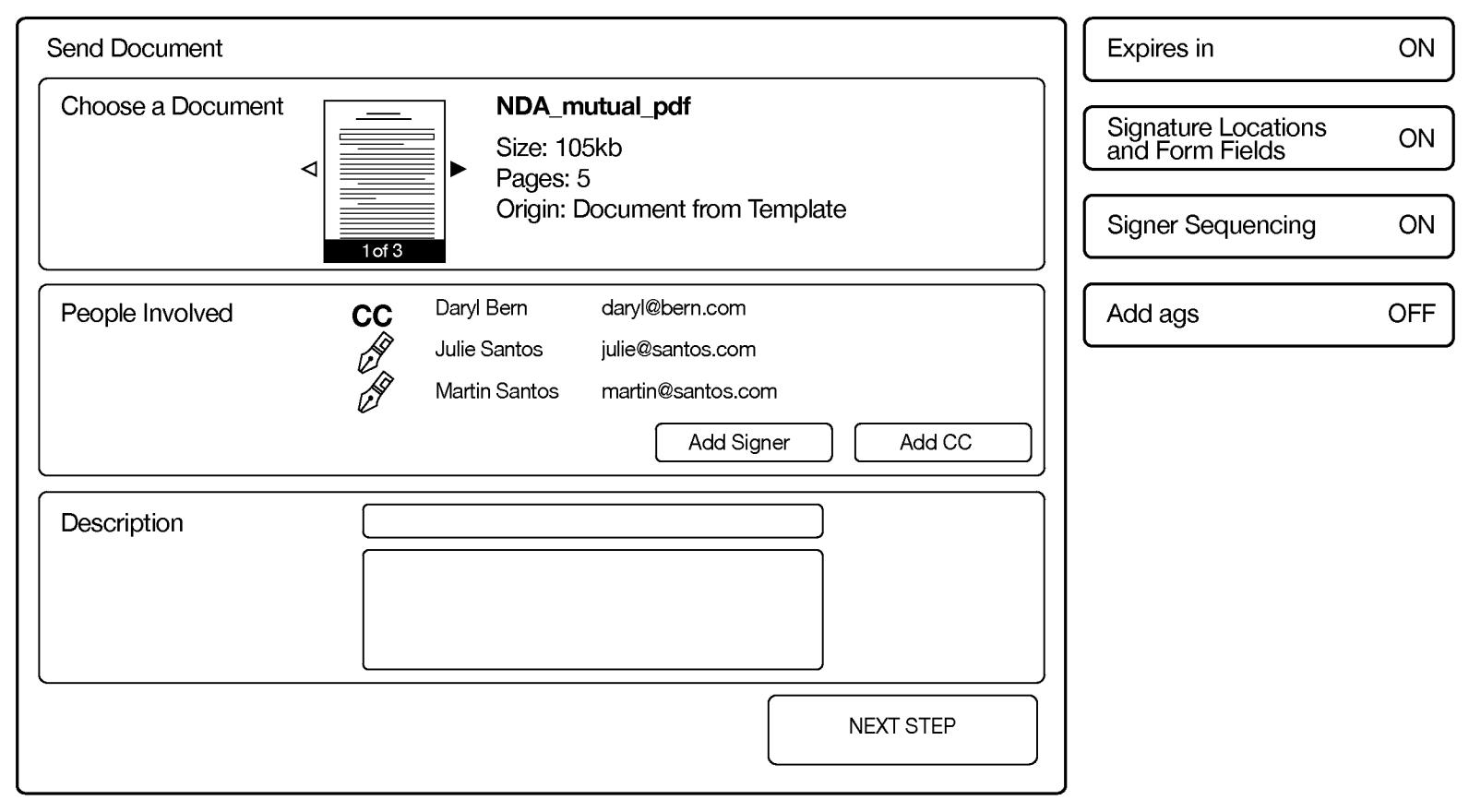
Figure 11E:

Turning now to FIGS. 11A-11M, this series of screen shots shows an exemplary embodiment of the present system and method. FIG. 11A shows a start-up/home screen for a website using the present system and method. Note that the sender user is prompted to "Choose a Document", name the "People Involved", (aka signer users), and enter a document "Description." In FIG. 11B, the sender user viewing this screen selects a "NDA" document from a selection of available template documents. The document sender may also import a self-generated document, or select a document from another source, as available.

FIG. 11C shows that a signer user has been selected, "Martin Santos," having an associated email address. The document sender may select from a library of contacts stored in association with the document sender's account information at the website, may manually enter the signer user contact information, or may otherwise import the information from a source. Note that to the right of the screen, the document sender has the option of associating an expiration date with the selected document. This expiration date is that date on which a signer user no longer can complete the signature fields of a received unsigned document. In addition, to the right of the screen is a counter indicating the number of signature locations and form fields that occur in the subject document. It also allows the document sender to include flags, or "tags" in the subject document.

Figure 11F:
Figure 11G:

FIG. 11D shows a screen in which the document sender selected two signer users ("Martin Santos" and "Julie Santos"), and also selected a non-signer user to receive a copy of the document, including the signed document ("cc" "Darl Bern"). FIG. 11E shows a document sender selecting a signature entry pad as a document overlay to insert in a signature field in the electronic document. FIG. 11F shows the screen that allows the document sender to identify which signer user is associated with which signature field. The screen allows the document sender to indicate whether a signature is required or optional, and associates a name with a given signature field for easily inserting the signature field in multiple locations in the document. FIG. 11G shows the signature entry pad associated with the signature field identified in the previous screen, located at the desired location within the document.

Figure 11H:
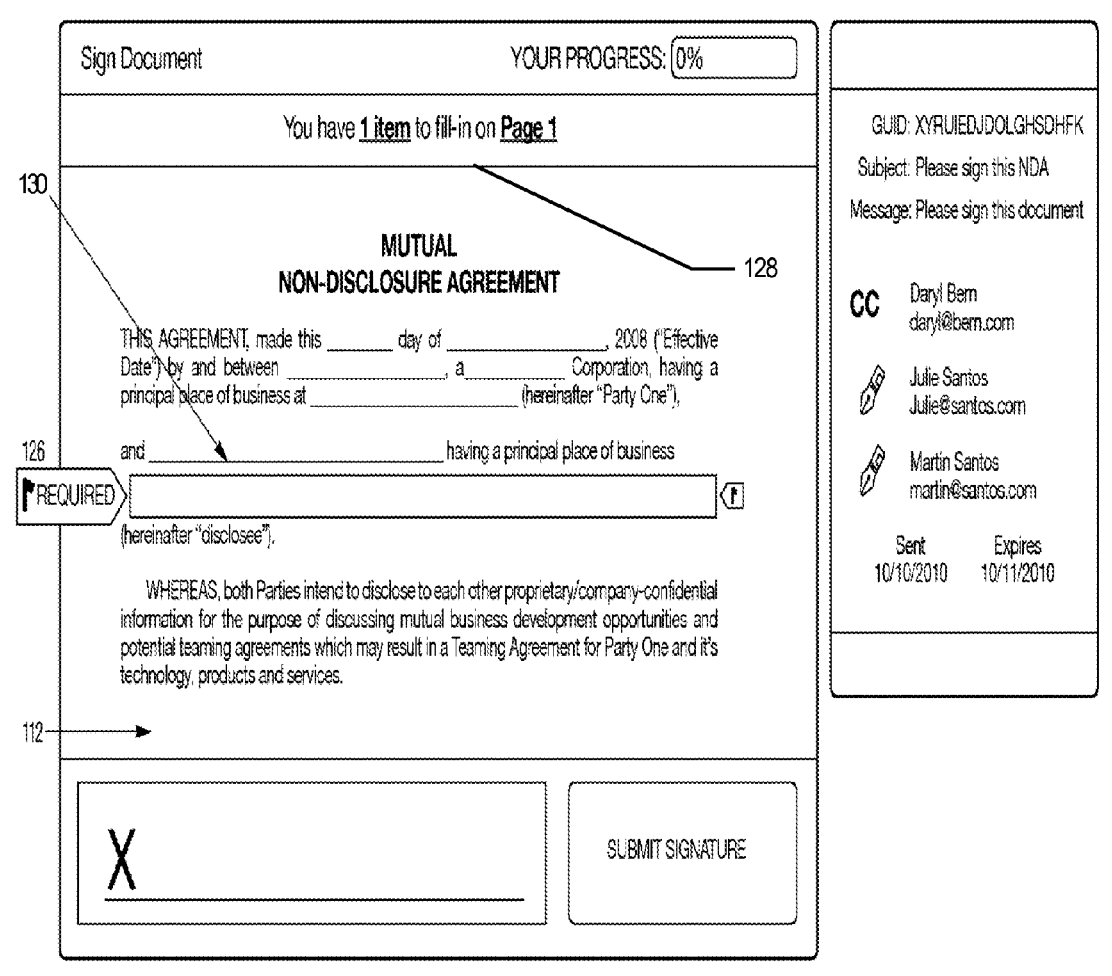

FIG. 11H shows a screen having a flag 126 to the left of a signature field 130 to be completed by a designated signer user, and summary text appearing at the top of the screen, indicating the number of signature fields to be completed in the document. At this point, the screen still is being viewed by the document sender as the unsigned electronic document is being generated. The above steps are repeated iteratively until all desired signature fields and associated signature entry pads are defined and placed throughout the document.

FIG. 11I shows a visual summary data indicator 124 that indicates certain information to the screen viewer about the subject unsigned electronic document 112 presented to a signer user. The visual may be in the form of a "thermometer-type" bar indicator (as shown), or any other visual quantitative indicator. The document summary server 108 collects information from each of the signer users regarding an unsigned electronic document. The collated information from the signer users is displayed on the information summary indicator 124 to indicate the level of completion of the signature fields within the target document. Note that at the top of the screen display for the document, are text instructions 128. These text instructions may function as an information summary indicator 124, as shown in FIG. 11I, or may be text instructions on what actions are required by the signer user, as shown in FIG. 11J.

Figure 11J:

FIG. 11J shows how the signature field and associated signature entry pad 132 appears to the signer user once the scaffold document is completed and sent to the signer user. Note that the information summary indicator 124 changes to reflect that there remains one incomplete signature field in the document. In a color version of this embodiment, pages having incomplete signature fields may appear in one color, such as red, whereas pages on which all signature fields are complete may appear in another color, such as blue. The information summary indicator 124 may include both a dynamic element, as in the illustrated embodiment, wherein an indicator "slides" from the top to the bottom of a bar to indicate level of completion, and/or a color element.

Figure 11K:
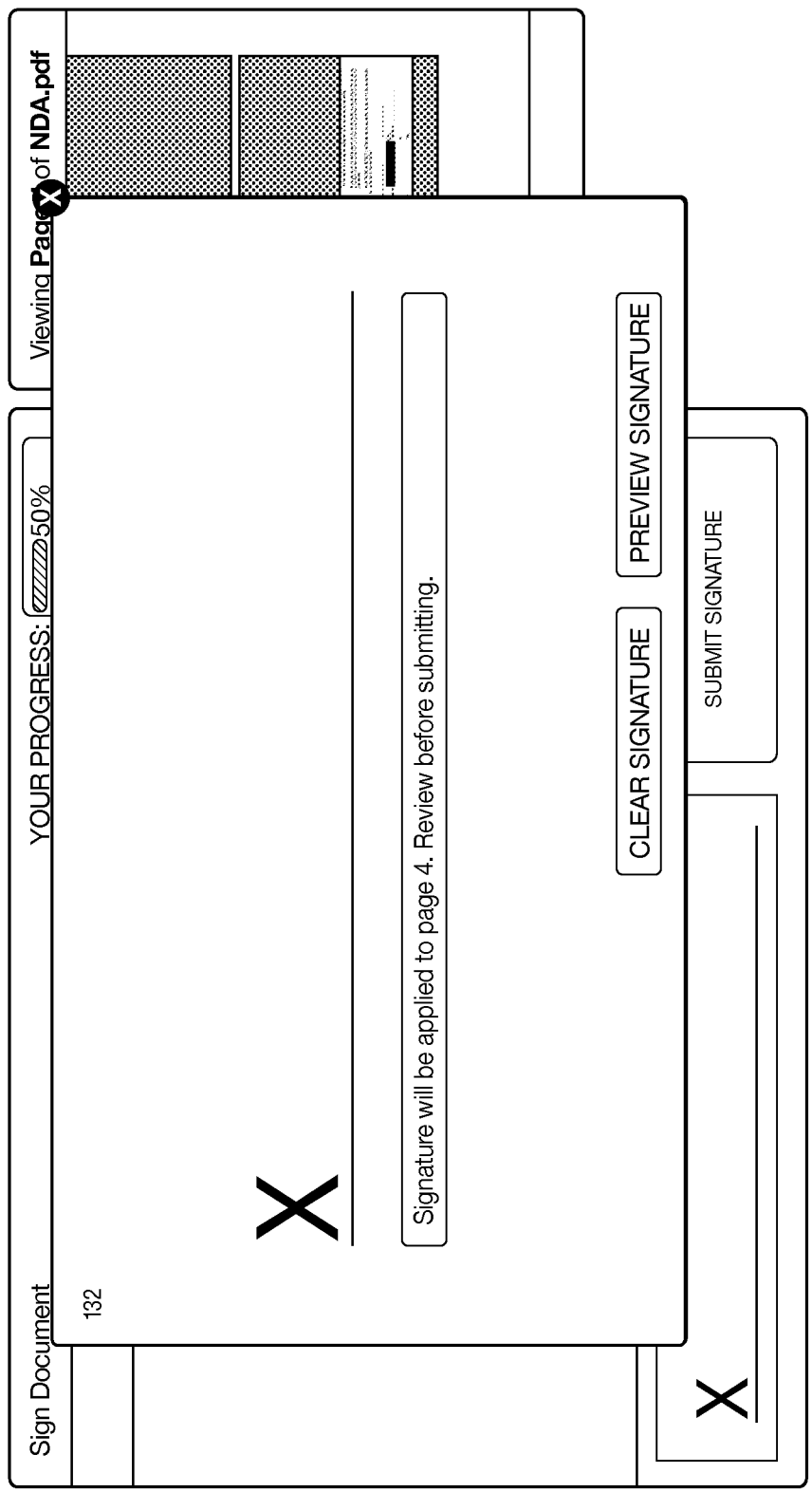
Figure 11L:
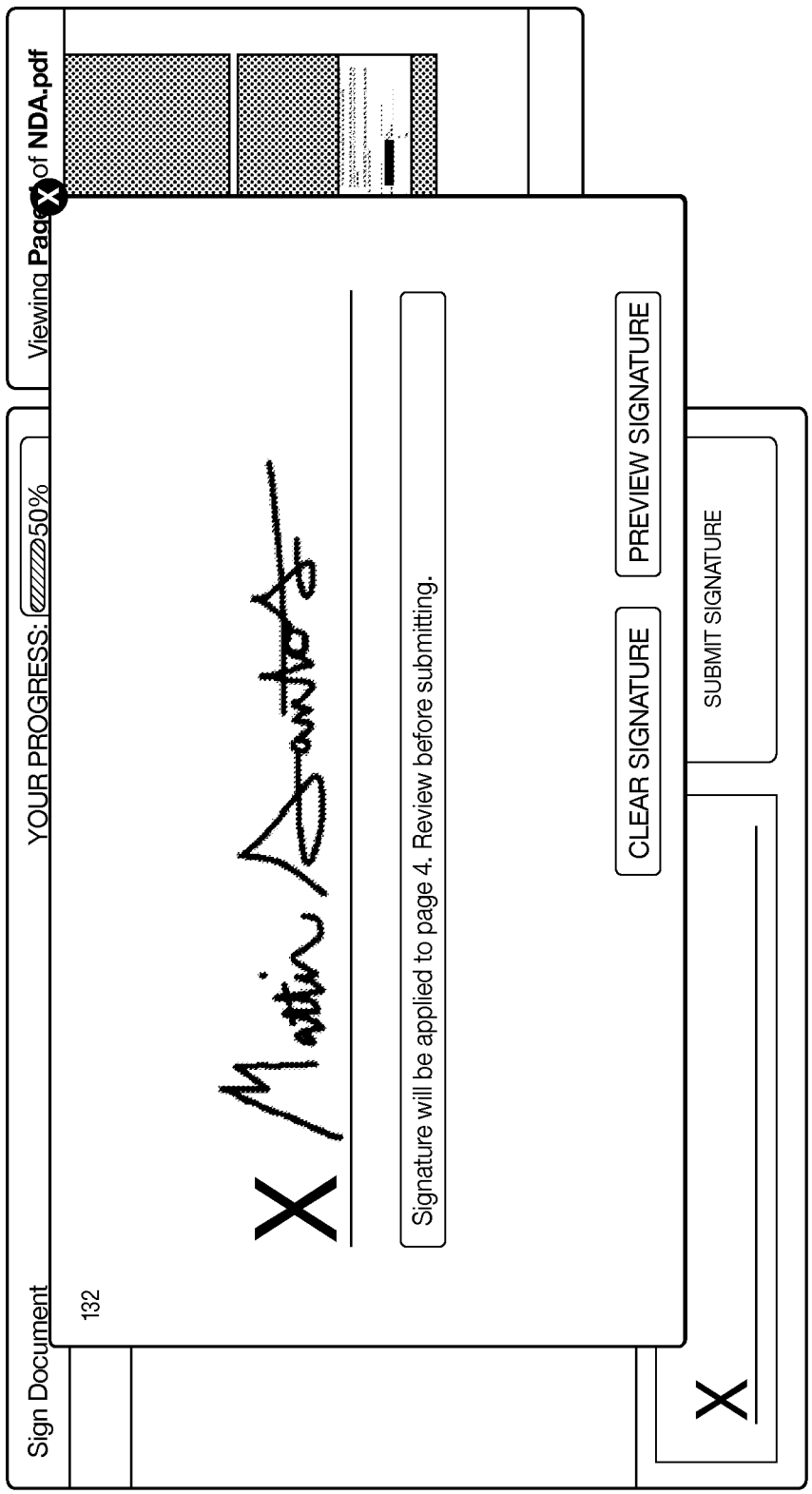
Figure 11M:

FIG. 11K is a close-up view of the signature field and associated signature entry pad 132, as shown in FIG. 11J. FIG. 11L shows the same signature field with a freehand signature included from a signer user. FIG. 11M shows a document with a signature in the signature field, prior to the signed document being submitted to the document execution server.

Although these screen shots show one implementation of the present method and system, there are many variations on the specific systems used, software programs and languages used, and layout and design used in implementing the present method and system within the scope of the claims.

The present method and system can be practiced in a number of variations, including variations on workflow. In an embodiment, some information entry fields 122 are identified as being required to be completed, whereas other fields 122 are optional. In an embodiment, the workflow order is adjusted in accordance with the type of document to be completed, the number and nature of the signer users 120 involved, and other variations based on the preferences set by the document sender 110. In one such embodiment, the document sender 110 is a set workflow order requiring one signer user 120 to complete one or more information entry fields 122 before certain other identified signer users. The document summary server 108 may include workflow order restrictions for an unsigned electronic document 112 requiring iterative, serial actions. For example, a document sender 110 may instruct that signer user 1 $U_1$ complete information entry field 1 $F_{1,1}$, followed by the completion by signer user 2 $U_2$ of information entry field 2 $F_{2,1}$, before signer user 1

$U_1$ completes information entry field 2 $F_{1,2}$, and so forth until all information entry fields are complete.

In a more simplified embodiment, the document summary server assigns a workflow order that requires a first signer user $U_1$ complete all information entry fields F prior to the document being sent to another signer user $U_i$. In another embodiment, the document summary server 108 requires that each signer user complete the information entry fields in a predetermined order; for example, for signer user 1, $U_1$, $F_{1,1}$, THEN $F_{1,2}$, and the like.

Alternative embodiments include various forms of exclusivity. For example, information entry fields may be shared by one or more signer user, such that either signer user may complete one or more designated information entry fields. This may be done on a per-field basis, or for all fields in an entire document. In another embodiment, information entry fields are shared by one or more signer users, such that each signer user individually completes a designated information entry field, and the information provided by each such signer user is concatenated to complete a single information entry field.

Alternative embodiments of the present system and method include variations on graphical updating of the summary data, represented by an information summary indicator 124. In another embodiment, upon receipt of the $F_{i,j}$ data, the graphical representation of the information summary indicator 124 is updated immediately to the user $U_1$. In another embodiment, upon receipt of the $F_{i,j}$ data, the graphical representation of the information summary indicator 124 is NOT updated immediately to the user $U_i$. In another embodiment, upon receipt of the $F_{i,j}$ data, the graphical representation of the information summary indicator 124 is updated immediately for future users, i.e., $U_{i+1}$.

In alternative embodiments of the present system and method, some $F_{i,j}$ may have default values that cannot be modified by a sender user, for example, "Date" information entry fields may automatically fill with the current date. In an alternative embodiment, some information entry fields have default values that can be modified by all or certain identified signer users. Alternatively, some information entry fields may be filled using a merge function, with data selected by the user signer. In another embodiment, some multiple $F_{i,j}$ are completed by information input only one time by the signer user; for example, a single signature event then is automatically input simultaneously into potentially many $F_{i,j}$ identified either by a signer user, or the document sender.

Further alternative embodiments include displaying to each signer user 120 different types and amounts of information relating to a scaffold document 118. For example, the screen display of an unsigned electronic document 112 may include the total number information entry fields |F| and the number of complete information entry fields |C|, but not the total number of incomplete information entry fields |I| for a specified document. Alternatively, the screen display of an unsigned electronic document 112 includes the total number information entry fields $|F_{i,j}|$ and the number of incomplete information entry fields |I|, but not the total number of complete information entry fields |C| for a specified document.

In another alternative embodiment, the screen displays the page numbers $P_{i,j}$ on which the next incomplete information entry field $I_{i,j}$ appears.

In an alternative embodiment, the display for a display screen on which the scaffold document 118 or the unsigned electronic document 112 appear includes a conventional moveable window that is slidable over the display of the unsigned electronic document to makes available for viewing only that portion of the document underlying the region of the window. An alternative of such an embodiment includes an actionable link $L_{i,j}$ is displayed to bring the next information entry field to the viewport. Alternatively, an actionable link $L_{i,j}$ is displayed for the incomplete required information entry fields $I_{i,j}$. Alternatively, a visual indicator of the next incomplete required information entry fields $Z_{i,j}$ is displayed for incomplete required information entry fields $I_{i,j}$. In yet another alternative, the visual indicator of the next incomplete required information entry field $Z_{i,j}$ is displayed for $I_{i,j}$ and includes an actionable link to bring the target information entry field into the viewport; for example, the visual indicator is an arrow on one side of the display screen, which arrow is clickable.

In addition, an alternative embodiment includes various ways of displaying to one or more signer user what information is entered by one or more of the other signer users. For example, the information summary indicator may display to one signer user which information entry fields are completed by the other signer user, and which remain incomplete. In this embodiment, for example, the completed information entry field by one user $C_{1,1}$ appears as a green box on the unsigned electronic document displayed to a second signer user, whereas an incomplete information entry field by one user $I_{i,j}$ is displayed as a red box on the unsigned electronic document displayed to the second user.

The various methods described above may be embodied in, and fully automated by, software code modules executed by one or more general purpose computers. The code modules may be stored in any type of computer storage device or devices (hard disk storage, solid state RAM, and the like). The steps may be implemented using any type of computer storage device or devices, and using any type or types of data repositories (relational databases, flat files, caches, and the like) to store any data.

As will be appreciated, various combinations of the features and methods described herein may be incorporated into a given system according to the invention. Accordingly, all combinations of the disclosed features and methods fall within the scope of this disclosure.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What we claim is:

1. A method for facilitating entry of information by a plurality of users into a scaffold electronic document, wherein the scaffold electronic document includes content displayable to the plurality of users as text and/or graphics on one or more pages and a set of one or more information entry fields associated with each of the users at one or more locations in the pages, where the information entry fields in each of the sets of the one or more information entry fields are adapted to receive information entered therein by a respective one of the plurality of users, said method comprising the steps of:

(a) displaying via a server over a network to each user of the plurality of users the scaffold electronic document;

(b) providing a graphic flag displayable to each respective user of the plurality of users in conjunction with the displaying of the scaffold electronic document, the graphic flag being displayable in proximity to at least one of the one or more information entry fields to indicate an information entry field that requires completion by the respective user, wherein, upon the respective user entering data into the information field that requires completion, the graphic flag is advanced to a next information entry field that requires completion by the respective user;

(c) receiving data via the server over the network from the plurality of users;

(d) modifying the scaffold electronic document to include user-entered information in response to receipt over the network of data indicative of entry of information by any of said plurality of users into the at least one of the one or more information entry fields; and (e) making the modified scaffold electronic document available via the server to at least one member of the group consisting of the sender and one or more "cc" recipients designated by the sender while obtaining information from the plurality of users progresses, wherein displaying the scaffold electronic document to each user includes:

displaying the graphic flag as a brightly-colored tab along a same visual line on a screen that requires the user to enter information;

displaying the graphic flag such that the graphic flag appears to extend out from an edge of the scaffold electronic document as an indicator to the user; and displaying the word "required" within the brightly colored tab.

2. The method of claim 1 further comprising providing a visual summary data indicator displayable to each user of the plurality of users to indicate a level of completion of signature fields within the scaffold electronic document.

3. The method of claim 2 wherein the visual summary data indicator includes a dynamic element and a color element.

4. The method of claim 1 wherein said information entry fields include at least one shared information entry field shared by at least two of said plurality of users, and further comprising sharing said at least one shared information entry field so that either of said at least two of said plurality of users may complete said shared information entry field.

5. The method of claim 1, wherein displaying the scaffold electronic document to each user includes displaying the graphic flag in a respective color or shape for that user, such that graphic flags for different users are displayed in different colors or shapes.

6. The method of claim 1, wherein the electronic scaffold document includes n information entry fields for a user, wherein the graphic flag initially points to a first information entry field, and wherein, each time the user enters information into the information entry field pointed to by the graphic flag, the flag server advances the graphic flag to a next information entry field in the electronic scaffold document, where the graphic flag is displayed to the user in a new location, until the user has entered information into all n information entry fields.

7. The method of claim 6, wherein, the information entry fields are ordered from 1 to n in a sender-determined order, and wherein each time the graphic flag advances, the graphic flag advances to a next information entry field in the sender-determined order.

8. The method of claim 7, wherein the sender-determined order is different for different users, such that the graphic flag advances according to different orders for different users.

9. A method for facilitating entry of information by a plurality of users into a scaffold electronic document, wherein the scaffold electronic document includes content displayable to the plurality of users as text and/or graphics on one or more pages and a set of one or more information entry fields associated with each of the users at one or more locations in the pages, where the information entry fields in each of the sets of the one or more information entry fields are adapted to receive information entered therein by a respective one of the plurality of users, said method comprising the steps of:

(a) displaying via a server over a network to each user of the plurality of users the scaffold electronic document;

(b) providing a graphic flag displayable to each respective user of the plurality of users in conjunction with the displaying of the scaffold electronic document, the graphic flag being displayable in proximity to at least one of the one or more information entry fields to indicate an information entry field that requires completion by the respective user, wherein, upon the respective user entering data into the information field that requires completion, the graphic flag is advanced to a next information entry field that requires completion by the respective user;

(c) receiving data via the server over the network from the plurality of users; and (d) modifying the scaffold electronic document to include user-entered information in response to receipt over the network of data indicative of entry of information by any of said plurality of users into the at least one of the one or more information entry fields, wherein displaying the scaffold electronic document to each user includes displaying the graphic flag as a brightly-colored tab along a same visual line on a screen that requires the user to enter information, wherein the electronic scaffold document includes n information entry fields for a user, wherein the graphic flag initially points to a first information entry field, and wherein, each time the user enters information into the information entry field pointed to by the graphic flag, the flag server advances the graphic flag to a next information entry field in the electronic scaffold document, where the graphic flag is displayed to the user in a new location, until the user has entered information into all n information entry fields;

wherein the information entry fields are ordered from 1 to n in a sender-determined order, and wherein each time the graphic flag advances, the graphic flag advances to a next information entry field in the sender-determined order.

10. The method of claim 9, wherein displaying the scaffold electronic document to each user includes displaying the graphic flag such that the graphic flag appears to extend out from an edge of the scaffold electronic document as an indicator to the user.

11. The method of claim 10, wherein displaying the scaffold electronic document to each user includes displaying the word "required" within the brightly colored tab.

12. The method of claim 9, wherein displaying the scaffold electronic document to each user includes displaying the graphic flag in a respective color or shape for that user, such that graphic flags for different users are displayed in different colors or shapes.

13. The method of claim 9, wherein the sender-determined order is different for different users, such that the graphic flag advances according to different orders for different users.

* * * * *